(12) United States Patent
Asami

(10) Patent No.: US 8,054,562 B2
(45) Date of Patent: Nov. 8, 2011

(54) IMAGING LENS AND IMAGING APPARATUS

(75) Inventor: Taro Asami, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/544,786

(22) Filed: Aug. 20, 2009

(65) Prior Publication Data

US 2010/0046094 A1  Feb. 25, 2010

(30) Foreign Application Priority Data

Aug. 21, 2008  (JP) .............................. P2008-212556

(51) Int. Cl.
*G02B 9/62* (2006.01)
*G02B 13/04* (2006.01)

(52) U.S. Cl. ....................................... 359/761; 359/752

(58) Field of Classification Search .................. 359/752, 359/761

See application file for complete search history.

(56) References Cited

U.S. PATENT DOCUMENTS

| | | | | |
|---|---|---|---|---|
| 3,982,823 | A * | 9/1976 | Momiyama et al. | 359/750 |
| 4,206,975 | A * | 6/1980 | Maeda | 359/761 |
| 6,844,987 | B2 * | 1/2005 | Endo et al. | 359/692 |
| 2009/0067063 | A1 | 3/2009 | Asami et al. | |

FOREIGN PATENT DOCUMENTS

| | | |
|---|---|---|
| JP | 11-142730 A | 5/1999 |
| JP | 3478643 B2 | 12/2003 |
| JP | 2005-24969 A | 1/2005 |
| JP | 3723637 B2 | 12/2005 |
| JP | 3723654 B2 | 12/2005 |

* cited by examiner

*Primary Examiner* — William Choi
(74) *Attorney, Agent, or Firm* — Birch, Stewart, Kolasch & Birch, LLP

(57) ABSTRACT

Disclosed is an imaging lens having a small F number, a wide angle of view, and a low manufacturing cost and capable of obtaining a high-quality image. An imaging lens includes a first lens having a negative power and including a concave surface facing an image side, a second lens having a positive power, an aperture diaphragm, a third lens having a negative power, an aperture diaphragm, a fourth lens having a positive power, a fifth lens having a positive power and including a convex surface facing the image side, and a sixth lens having a negative power arranged in this order from an object side. When the curvature radius of an image-side surface of the third lens is R3$r$ and the curvature radius of an object-side surface of the fourth lens is R4$f$, the imaging lens satisfies the following Conditional expression:

|R3$r$/R4$f$|<1.0.

16 Claims, 14 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 1

EXAMPLE 2

EXAMPLE 3

EXAMPLE 4

EXAMPLE 5

EXAMPLE 6

EXAMPLE 7

EXAMPLE 8

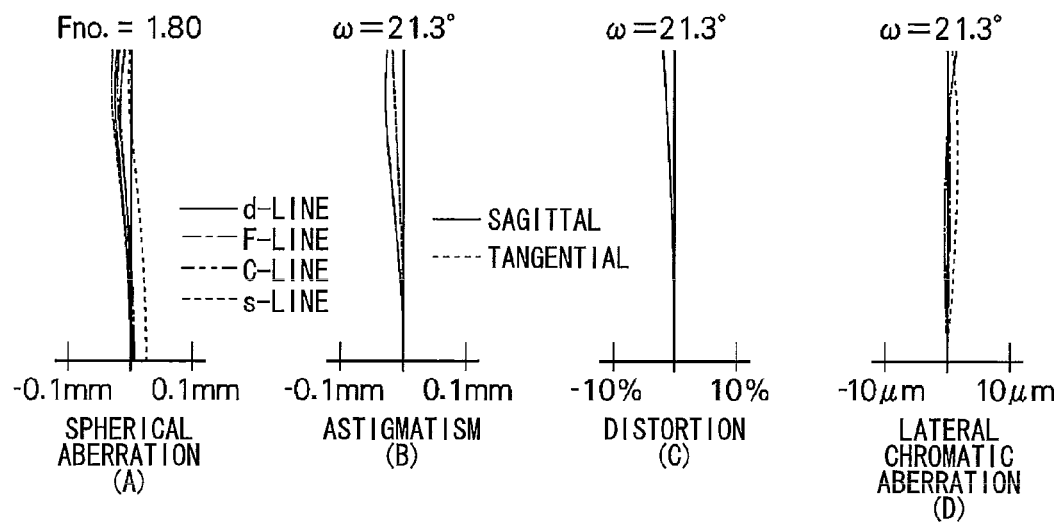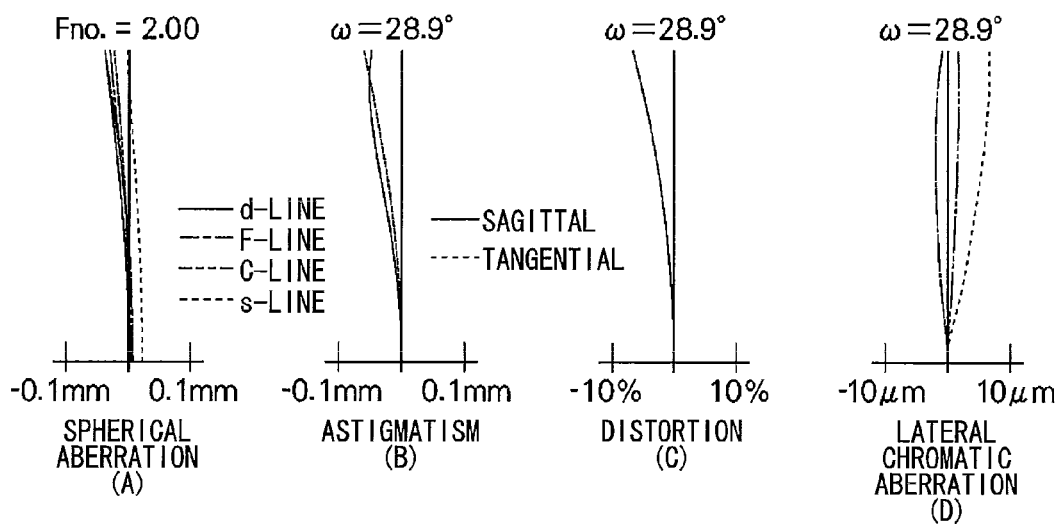

EXAMPLE 11

EXAMPLE 12

IMAGING LENS AND IMAGING APPARATUS

CROSS-REFERENCE TO RELATED APPLICATIONS

This application is based upon and claims the benefit of priority from the Japanese Patent Application No. 2008-212556 filed on Aug. 21, 2008; the entire contents of which are incorporated herein by reference.

BACKGROUND OF THE INVENTION

1. Field of the Invention

The present invention relates to an imaging lens and an imaging apparatus, and more particularly, to an imaging lens applicable for, for example, an in-vehicle camera, a mobile terminal camera, or a monitoring camera using an imaging device, such as a CCD (charge coupled device) or a CMOS (complementary metal oxide semiconductor), and an imaging apparatus including the imaging lens.

2. Description of the Related Art

In recent years, the size of an imaging device, such as a CCD or a CMOS, has been reduced, and the number of pixels thereof has increased. In addition, the size of an imaging apparatus including the imaging device has been reduced. Therefore, it is necessary to improve the optical performance of an imaging lens provided in the imaging apparatus and reduce the size and weight of the imaging lens.

Meanwhile, for example, an in-vehicle camera or a monitoring camera requires a high-performance lens that has high weather resistance, can be used in a wide temperature range in a vehicle from a low temperature in a cold region to a high temperature in a tropical region, and has such a small F number that it can be used in the night.

Japanese Patent Application Nos. 2007-236445 and 2008-193299 (which correspond to US 2009/0067063) and Japanese Patent Application No. 2008-59127 filed by the inventors disclose a lens system having six lenses including a cemented lens as an imaging lens that can be used in the above-mentioned field. In addition, Japanese Patent No. 3723654, JP-A-2005-24969, JP-A-11-142730, Japanese Patent No. 3723637, and Japanese Patent No. 3478643 disclose imaging lenses that can be used in the above-mentioned field. Japanese Patent No. 3723654 discloses an imaging lens including five lenses, that is, negative, positive, negative, positive, and positive lenses arranged in this order. JP-A-2005-24969 and JP-A-11-142730 disclose an imaging lens including six lenses that are classified into a front group including an aspheric lens and a rear group having a positive refractive power. Japanese Patent No. 3723637 discloses an imaging lens that includes six lenses and has a large back focal length. Japanese Patent No. 3478643 discloses an imaging lens including six lenses in which a cemented lens is arranged closest to an image side.

However, the imaging lens disclosed in Japanese Patent No. 3723654 includes five lenses, and the aberration of the imaging lens needs to be reduced, as compared to an imaging lens having six lenses.

The imaging lens disclosed in JP-A-2005-24969 and JP-A-11-142730 use an aspheric lens. However, when the aspheric lens is made of resin, the performance of the imaging lens is likely to be lowered due to a temperature variation. Therefore, when the imaging lens is used in a wide temperature range, problems may arise. For this reason, it is preferable that the aspheric lens be made of glass. However, when the aspheric lens is made of glass, a glass mold is needed to manufacture the aspheric lens, which results in an increase in manufacturing costs.

The imaging lenses disclosed in Japanese Patent No. 3723637 and Japanese Patent No. 3478643 use only the glass spherical lens. Therefore, the imaging lens is cheaper than a structure using a glass mold aspheric lens. However, since the imaging lens disclosed in Japanese Patent No. 3723637 has a large total length, sufficient reduction in the size of the imaging lens is not achieved. The imaging lens disclosed in Japanese Patent No. 3478643 has a relatively small size, but the F number thereof is 2.8. Therefore, the imaging system is not fast enough to be used for an in-vehicle camera or a monitoring camera.

Meanwhile, in the above-mentioned imaging apparatuses, in some cases, a ghost is generated in an image surface due to light reflection from each lens surface or the imaging surface of the CCD. Therefore, there is a concern that it may be difficult to exactly recognize an image according to the degree of ghost. In particular, it is necessary to prevent the generation of the ghost in an imaging apparatus, such as a monitoring camera or an in-vehicle camera that captures the image of the front side and performs image processing.

SUMMARY OF THE INVENTION

The invention has been made in order to solve the above-mentioned problems, and an object of the invention is to provide an imaging lens that has a small F number, a low manufacturing cost, and a small size and can obtain a high-quality image, and an imaging apparatus including the imaging lens.

According to a first aspect of the invention, an imaging lens includes: a first lens that is made of glass, has a negative power and includes a concave surface facing an image side; a second lens having a positive power; a third lens having a negative power; a fourth lens having a positive power; a fifth lens that has a positive power and includes a convex surface facing the image side; a sixth lens having a negative power; and a stop positioned in rear of the second lens or the third lens. The first to sixth lenses are arranged in this order from an object side. When the curvature radius of an image-side surface of the third lens is R3r and the curvature radius of an object-side surface of the fourth lens is R4f, the imaging lens satisfies Conditional expression 1 given below:

$$|R3r/R4f| < 1.0. \qquad \text{[Conditional Expression 1]}$$

As described above, according to the imaging lens of the first aspect, it is effective to obtain an optical system having a small size and a small F number by appropriately selecting the structure of each lens. Further, since the imaging lens does not necessarily use an aspheric surface, it is possible to reduce manufacturing costs. In addition, since the imaging lens according to the first aspect of the invention is configured so as to satisfy Conditional expression 1, it is effective to correct field curvature and prevent the generation of a ghost.

According to a second aspect of the invention, an imaging lens includes: a first lens that has a negative power and includes a concave surface facing an image side; a second lens having a positive power; a third lens having a negative power; a fourth lens having a positive power; a fifth lens that has a positive power and includes a convex surface facing the image side; a sixth lens having a negative power; and a stop positioned in rear of the second lens or the third lens. The first to sixth lenses are arranged in this order from an object side, and each of the lenses is a single lens.

As described above, according to the imaging lens of the second aspect, it is effective to obtain an optical system having a small size and a small F number by appropriately selecting the structure of each lens. Further, since the imaging lens does not necessarily use an aspheric surface, it is possible to reduce manufacturing costs. In addition, in the imaging lens according to the second aspect of the invention, each of the lenses is a single lens. That is, the entire lens system does not use a cemented lens. Therefore, it is possible to manufacture an imaging lens with a low manufacturing cost.

The imaging lenses according to the first and second aspects of the invention may satisfy the following Conditional expressions 2 to 7. In addition, the imaging lenses may satisfy any one of the following Conditional expressions 2 to 7 or any combinations thereof:

$f3456/f > 0.8$, [Conditional expression 2]

$0.6 < f5/f < 1.2$, [Conditional expression 3]

$-2.0 < f6/f < -0.6$, [Conditional expression 4]

$-1.5 < f3/f < -0.5$, [Conditional expression 5]

$-1.2 < R9/f < -0.5$, [Conditional expression 6]

and $0.5 < f4/f5 < 1.5$ [Conditional expression 6]

(where f indicates the focal length of the entire lens system, f3 indicates the focal length of the third lens, f4 indicates the focal length of the fourth lens, f5 indicates the focal length of the fifth lens, f6 indicates the focal length of the sixth lens, f3456 indicates a composite focal length from the third lens to the sixth lens, and R9 indicates the curvature radius of an image-side surface of the fourth lens).

In the imaging lenses according to the first and second aspects of the invention, it is preferable that the Abbe number of each lens be set as follows. In addition, the Abbe number of any one of the lenses may be set as follows, or the Abbe number of any combination of the lenses may be set as follows. The Abbe number of the first lens with respect to the d-line (wavelength: 587.6 nm) may be equal to or greater than 40. The Abbe number of the second lens with respect to the d-line may be greater than 32. The Abbe number of the fourth lens with respect to the d-line may be equal to or greater than 35. The Abbe number of the fifth lens with respect to the d-line may be equal to or greater than 35. The Abbe number of the sixth lens with respect to the d-line may be equal to or less than 30.

In the invention, when a lens surface is convex toward the object side, the 'curvature radius' of the lens surface has a positive value. When a lens surface is convex toward the image side, the 'curvature radius' of the lens surface has a negative value.

According to the invention, an imaging apparatus includes the above-mentioned imaging lens.

According to the imaging lens of the first aspect of the invention, in a lens system including at least six lenses, for example, the shape and power of each lens is appropriately set to satisfy Conditional expression 1. Therefore, it is possible to achieve an imaging lens that has a small F number, a small size, and a low manufacturing cost and can obtain a high-quality image.

According to the imaging lens of the second aspect of the invention, in a lens system including at least six lenses, for example, the shape and power of each lens is appropriately set, and each of the lenses is a single lens. Therefore, it is possible to achieve an imaging lens that has a small F number, a small size, and a low manufacturing cost and can obtain a high-quality image.

According to the invention, the imaging apparatus includes the imaging lens according to the above-described invention. Therefore, it is possible to achieve an imaging apparatus that is suitable for an in-vehicle camera or a monitoring camera, has a small size and a low manufacturing cost, and can obtain a high-quality image.

BRIEF DESCRIPTION OF THE DRAWINGS

FIG. 23 is a diagram illustrating the aberrations of the imaging lens according to Example 9, in which (A) shows spherical aberration, (B) shows astigmatism, (C) shows distortion, and (D) shows lateral chromatic aberration;

FIG. 24 is a diagram illustrating the aberrations of the imaging lens according to Example 10, in which (A) shows spherical aberration, (B) shows astigmatism, (C) shows distortion, and (D) shows lateral chromatic aberration;

DESCRIPTION OF THE PREFERRED EMBODIMENTS

Hereinafter, exemplary embodiments of the invention will be described in detail with reference to the accompanying drawings. First, an imaging lens according to an embodiment of the invention will be described, and then an imaging apparatus according to another embodiment of the invention will be described.

An imaging lens according to the first embodiment of the invention, in a case where the stop is positioned in rear of the second lens will be described.

Figure 1:
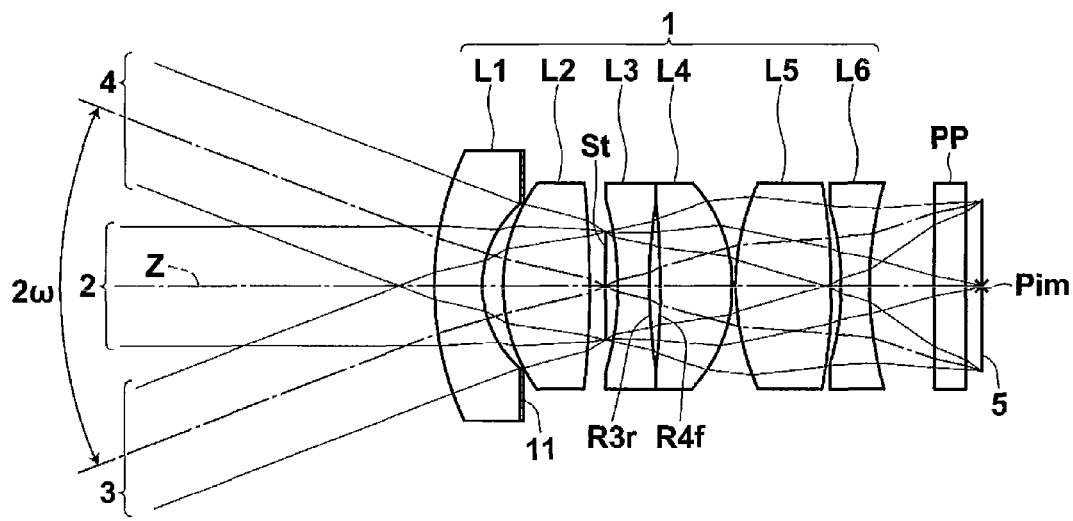
FIG. 1 is a diagram illustrating an optical path of an imaging lens according to a first embodiment of the invention in a case where a stop is positioned in rear of a second lens.
Figure 3:
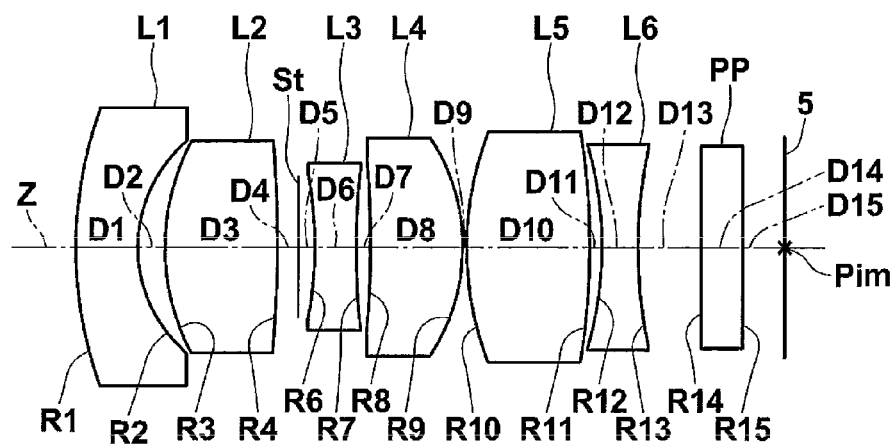
FIG. 3 is a cross-sectional view illustrating the structure of an imaging lens according to Example 1 of the invention.
Figure 4:
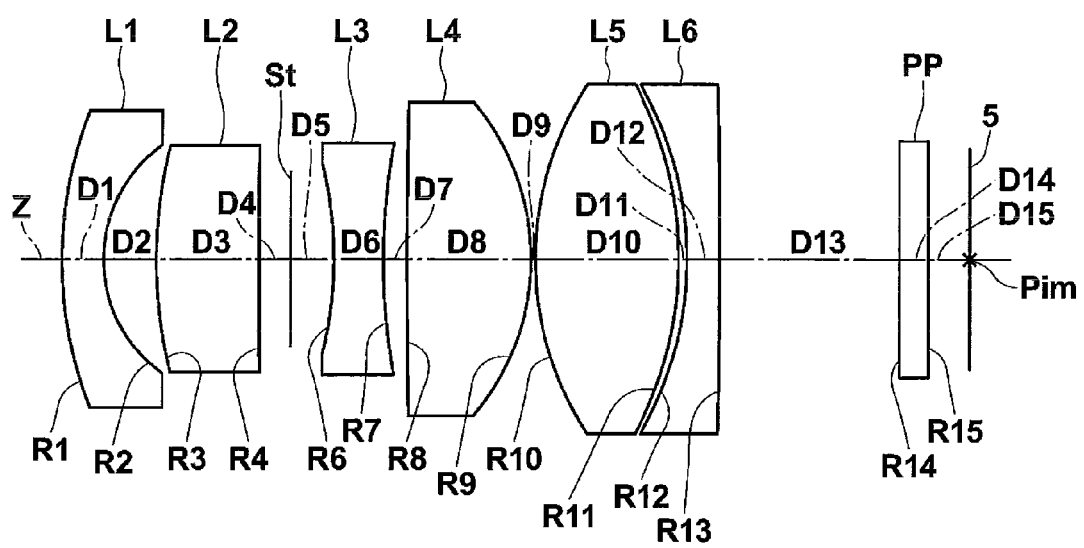
FIG. 4 is a cross-sectional view illustrating the structure of an imaging lens according to Example 2 of the invention.
Figure 5:
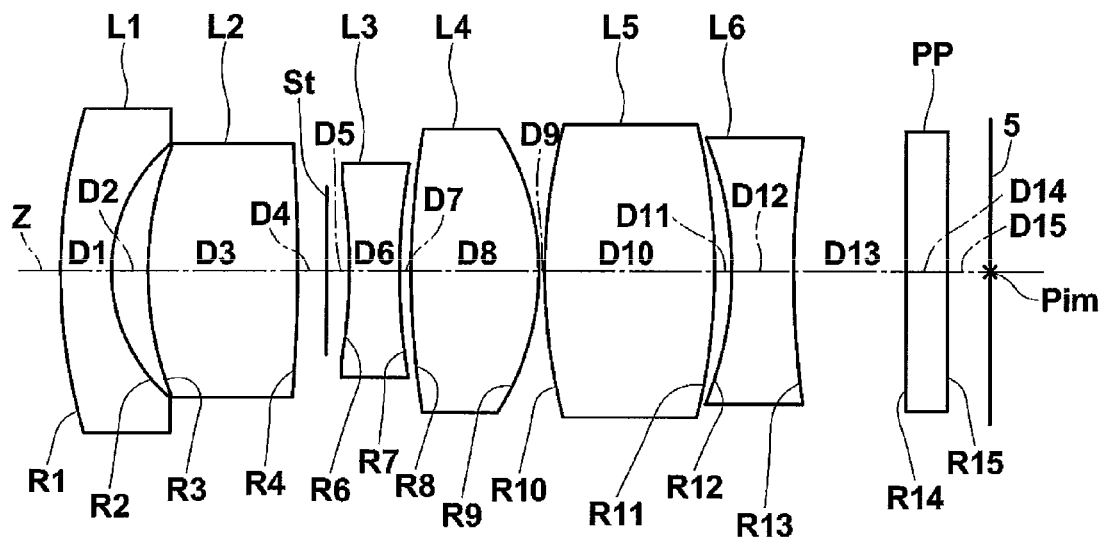
FIG. 5 is a cross-sectional view illustrating the structure of an imaging lens according to Example 3 of the invention.
Figure 6:
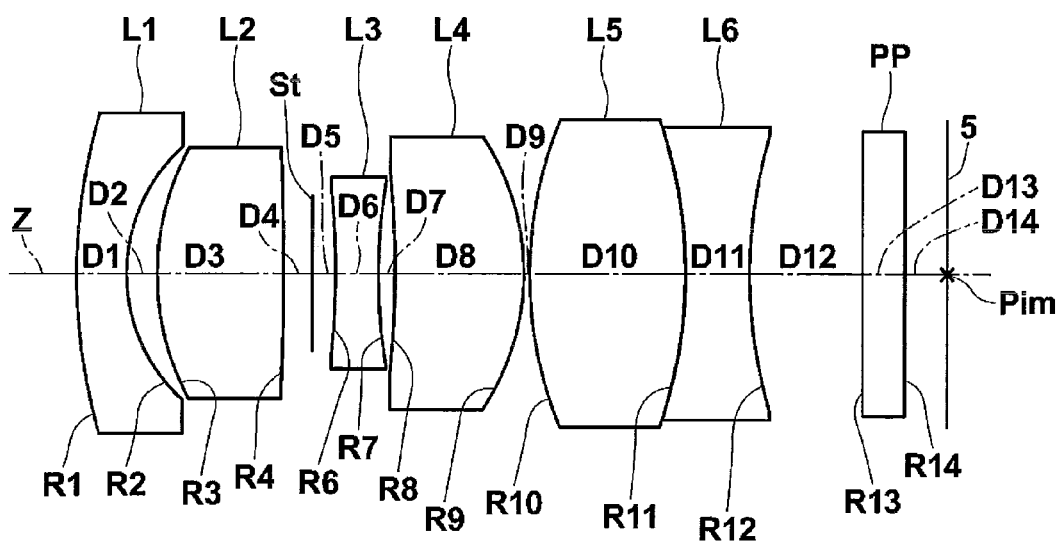
FIG. 6 is a cross-sectional view illustrating the structure of an imaging lens according to Example 4 of the invention.
Figure 7:
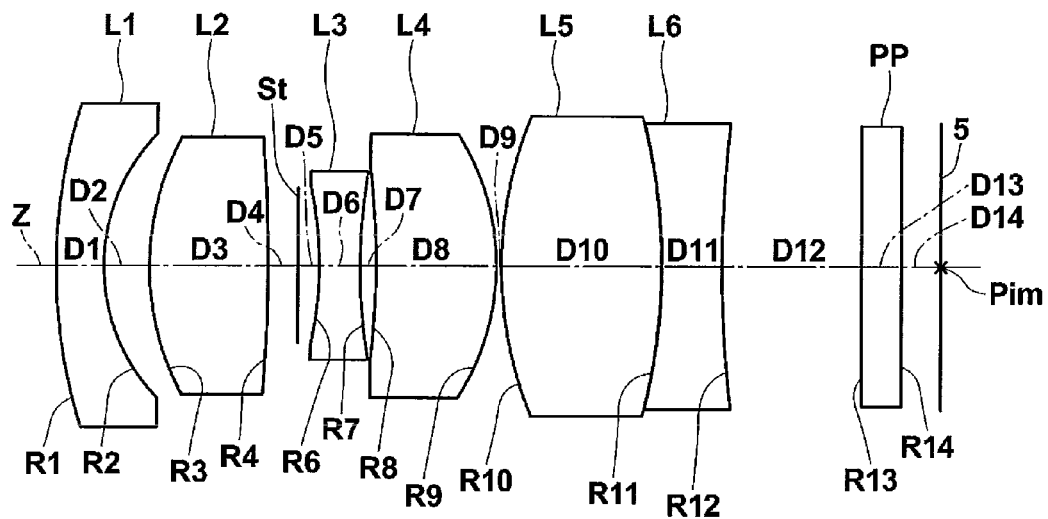
FIG. 7 is a cross-sectional view illustrating the structure of an imaging lens according to Example 5 of the invention.
Figure 8:
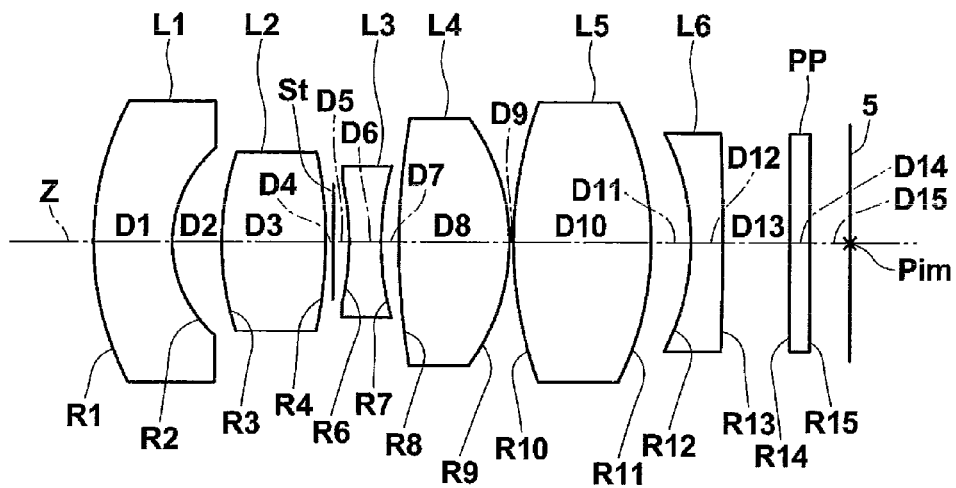
FIG. 8 is a cross-sectional view illustrating the structure of an imaging lens according to Example 6 of the invention.
Figure 9:
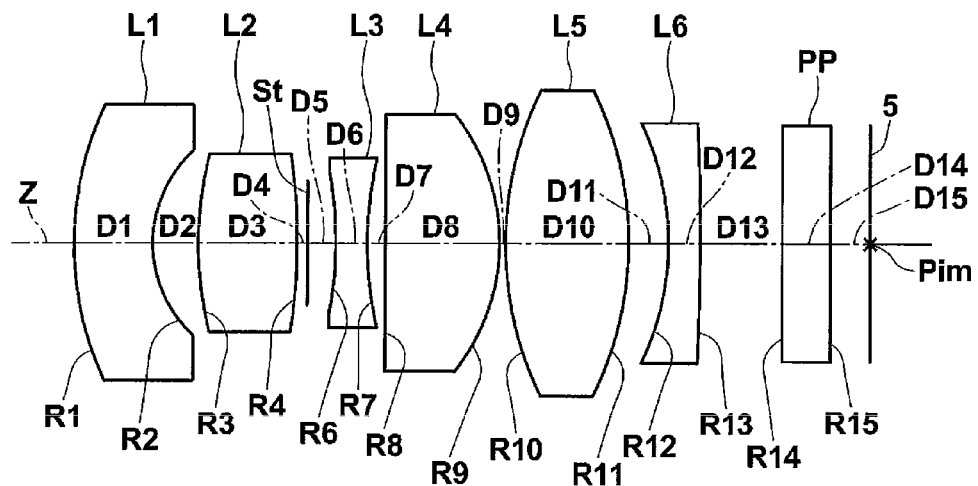
FIG. 9 is a cross-sectional view illustrating the structure of an imaging lens according to Example 7 of the invention.
Figure 10:
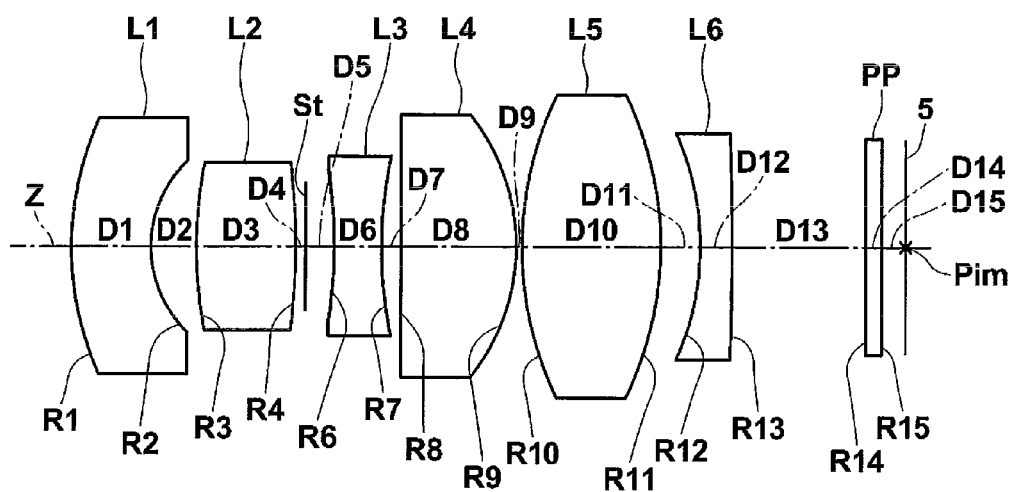
FIG. 10 is a cross-sectional view illustrating the structure of an imaging lens according to Example 8 of the invention.

FIG. 1 is a cross-sectional view illustrating an imaging lens 1 according to a first embodiment of the invention. The structural example shown in FIG. 1 corresponds to the structure of a lens according to Example 1, which will be described below, shown in FIG. 3. In FIG. 1, the left side is an object side, and the right side is an image side. FIG. 1 also shows the focusing of an on-axis beam 2 from an infinite object point and off-axis beams 3 and 4 at a maximum angle of view. In this case, the on-axis beam is a beam from an object point on an optical axis Z, and the off-axis beam is a beam from the object point out of the optical axis Z.

As shown in FIG. 1, the imaging lens 1 includes a first lens L1 that has a negative power and includes a concave surface facing an image side, a second lens L2 having a positive power, an aperture diaphragm St, a third lens L3 having a negative power, a fourth lens L4 having a positive power, a fifth lens L5 that has a positive power and includes a convex surface facing the image side, and a sixth lens L6 having a negative power arranged in this order from an object side. FIG. 1 also shows an imaging device 5 that is arranged on an image surface including the imaging position Pim of the imaging lens 1, considering when the imaging lens 1 is applied to an imaging apparatus. The imaging device 5 converts an optical image formed by the imaging lens 1 into electric signals, and is composed of, for example, a CCD image sensor.

When the imaging lens 1 is applied to an imaging apparatus, it is preferable to provide, for example, a cover glass, a low pass filter, or an infrared cut filter according to the structure of a camera provided with the lens. FIG. 1 shows an example in which an optical member PP, which is a plane parallel plate, is provided between a lens system and the imaging device 5 considering the above. For example, when the imaging lens 1 is used for a night-vision camera that is provided in a vehicle to aid night vision, a filter that cuts light in the range from blue light to ultraviolet light may be provided between the lens system and the imaging device.

Instead of providing a low pass filter or various filters for cutting a specific wavelength band between the lens system and the imaging device 5, various filters may be provided between the lenses. Alternatively, a coat having the same effect as various filters is formed on the lens surface of any lens of the imaging lens 1.

In the imaging lens 1, since the aperture diaphragm St is provided between the second lens L2 and the third lens L3, it is possible to reduce the beam height of an object-side surface of the first lens L1. As the beam height is decreased, the effective diameter of the first lens L1 is decreased. Therefore, it is possible to reduce the outside diameter of the first lens L1 and thus reduce the size of a lens system. In addition, when the outside diameter is reduced, it is possible to reduce the area of the lens exposed to the outside. For example, when the imaging lens 1 is provided in an in-vehicle camera, it is preferable that a small portion of the lens be exposed to the outside in order to prevent the outward appearance of the vehicle from being damaged. Therefore, the imaging lens 1 is configured to meet the requirements.

Figure 2:
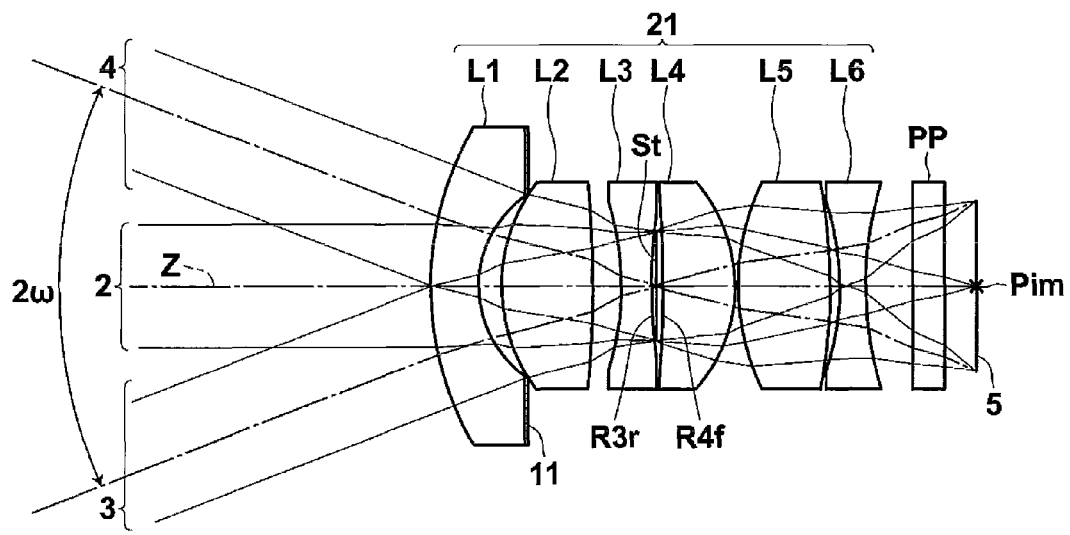
FIG. 2 is a diagram illustrating an optical path of an imaging lens according to the first embodiment of the invention in a case where the stop is positioned in rear of a third lens.
Figure 11:
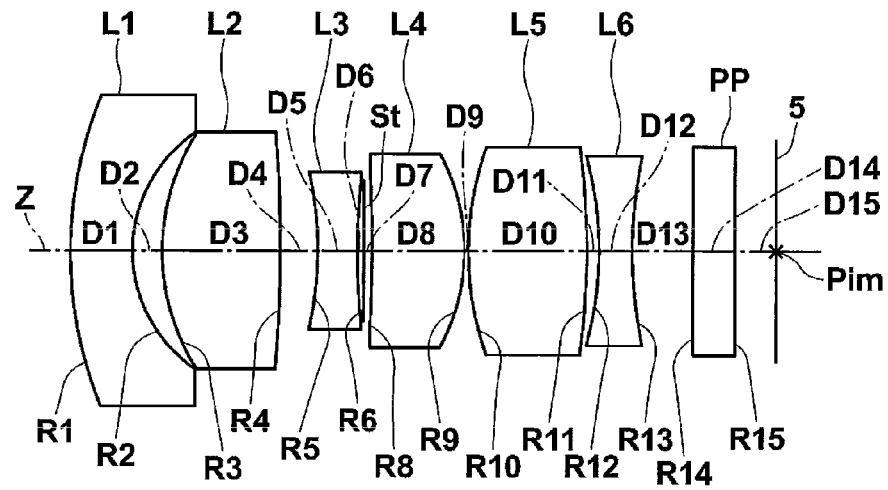
FIG. 11 is a cross-sectional view illustrating the structure of an imaging lens according to Example 9 of the invention.
Figure 12:
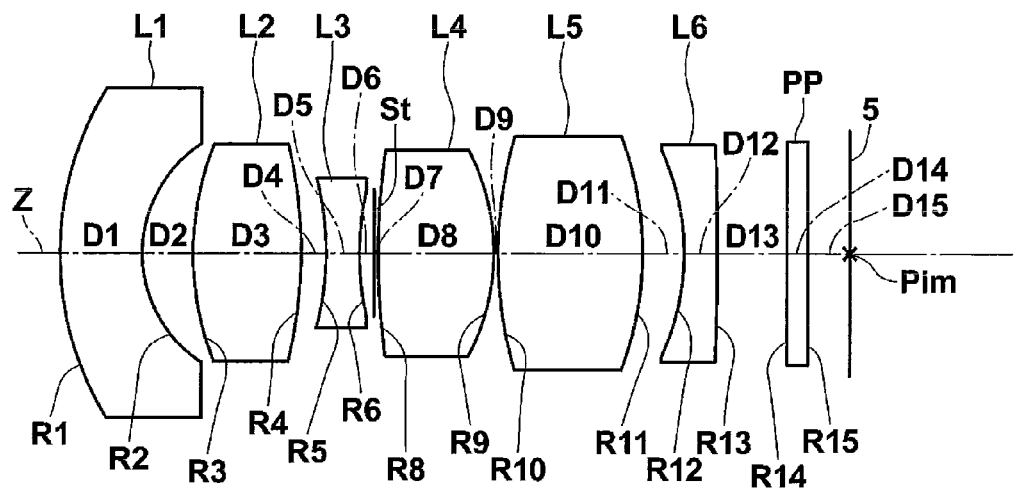
FIG. 12 is a cross-sectional view illustrating the structure of an imaging lens according to Example 10 of the invention.
Figure 13:
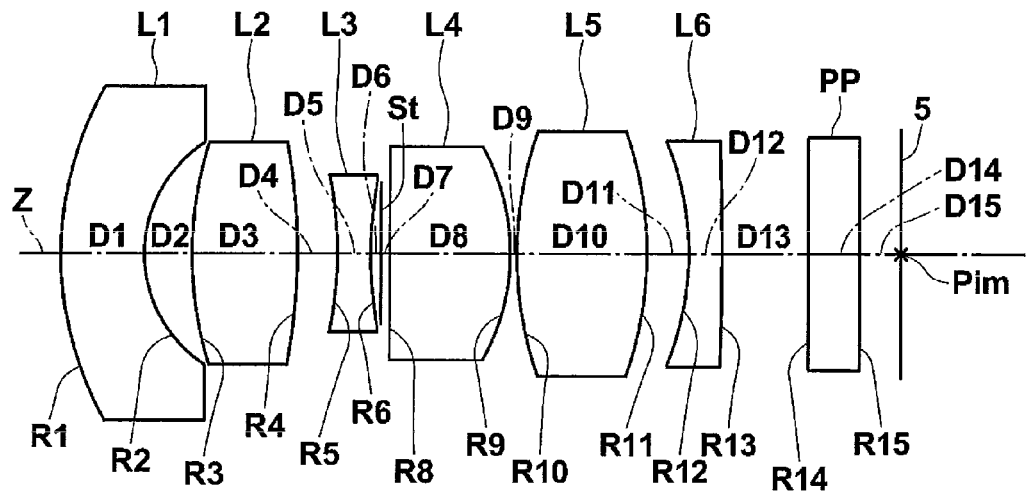
FIG. 13 is a cross-sectional view illustrating the structure of an imaging lens according to Example 11 of the invention.
Figure 14:
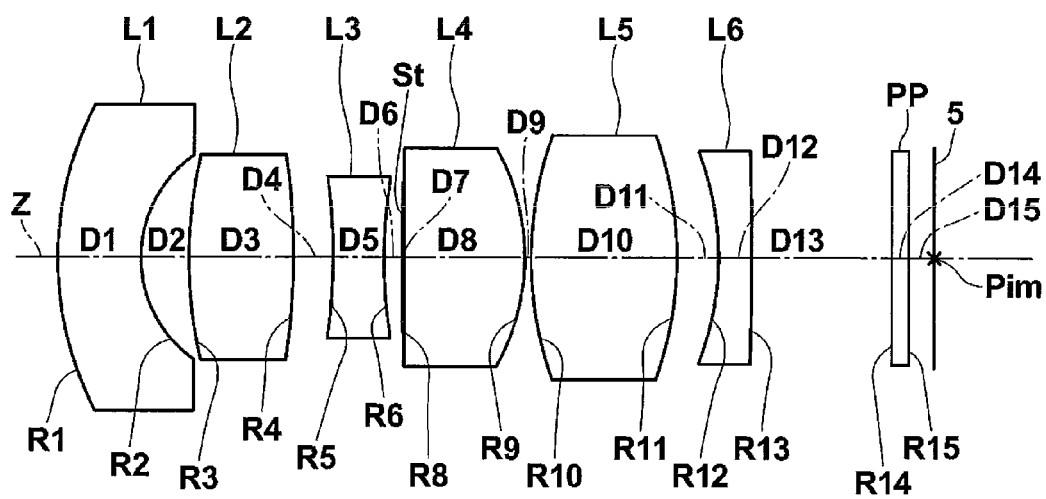
FIG. 14 is a cross-sectional view illustrating the structure of an imaging lens according to Example 12 of the invention.

Next, an imaging lens according to the first embodiment of the invention, in a case where the stop is positioned in rear of the third lens, will be described. FIG. 2 is a cross-sectional view illustrating an imaging lens 21 according to the first embodiment of the invention in a case where the stop is positioned in rear of the third lens. The structural example shown in FIG. 2 corresponds to the structure of a lens according to Example 9, which will be described below, shown in FIG. 11. Similar to FIG. 1, in FIG. 2, the left side is an object side, and the right side is an image side. FIG. 2 also shows the focusing of an on-axis beam 2 from an infinite object point, off-axis beams 3 and 4 at a maximum angle of view, an imaging device 5 that is arranged on an image surface including an imaging position Pim, and an optical member PP.

As shown in FIG. 2, the imaging lens 21 includes a first lens L1 that has a negative power and includes a concave surface facing the image side, a second lens L2 having a positive power, a third lens L3 having a negative power, an aperture diaphragm St, a fourth lens L4 having a positive power, a fifth lens L5 that has a positive power and includes a convex surface facing the image side, and a sixth lens L6 having a negative power. The first to sixth lenses are arranged in this order from the object side. That is, the basic structure of the imaging lens according to the first embodiment of the invention, in a case where the stop is positioned in rear of the third lens is similar to that of the imaging lens according to the first embodiment of the invention, in a case where the stop is positioned in rear of the second lens.

In the imaging lens 21, the aperture diaphragm St is provided between the third lens L3 and the fourth lens L4. As shown in FIG. 2, in the imaging lens 21, the aperture diaphragm St is provided substantially at the center of a lens system including six lenses. Therefore, it is possible to reduce the beam height of each of an object-side surface of a lens closest to the object side and an image-side surface of a lens closest to the image side, as compared to a lens system in which the aperture diaphragm is disposed at a position leaning toward the object side from the center or a position leaning toward the image side from the center. As the beam height is decreased, the effective diameter of the lens is decreased. Therefore, it is effective to reduce the size of a lens system.

The first lens L1 of each of the imaging lenses according to the first and second embodiments has a negative power and includes a concave surface facing the image side. According to this structure, it is possible to increase the angle of view of the entire lens system.

It is preferable that the imaging lenses according to the first and second embodiments of the invention satisfy Conditional expression given below:

|R3r/R4f|<1.0   [Conditional expression 1]

(where R3r indicates the curvature radius of an image-side surface of the third lens L3 and R4f indicates the curvature radius of an object-side surface of the fourth lens L4).

If the absolute value is greater than the upper limit of Conditional expression 1, it is difficult to correct field curvature, and the incident angle of a light beam on the lens surface with respect to a normal line in the periphery of the fourth lens L4 is increased. As a result, there is a concern that a ghost will be generated due to light reflection in the periphery or the outer circumference of the lens.

In the imaging lenses according to the first and second embodiments, it is preferable that each of the lenses be a single lens. When each of the lenses is a single lens and a cemented lens is not used, it is possible to manufacture a lens system with a low cost and improve environment resistance.

Next, the preferred common structure and the operations and effects of the imaging lenses according to the first and second embodiments will be described. It is preferable that each of the imaging lenses have any one of the following preferred structures or any combination thereof.

It is preferable that the first lens L1 have a meniscus shape in which a concave surface faces the image side. This shape makes it possible to increase the angle of view of the entire lens system and effectively correct field curvature while preventing the occurrence of distortion.

It is preferable that the second lens L2 have a convex surface facing the object side. In this case, it is possible to effectively correct the field curvature. In addition, it is preferable that the absolute value of the curvature radius of an object-side surface of the second lens L2 be smaller than the absolute value of the curvature radius of an image-side surface thereof. In this case, it is possible to effectively correct the field curvature. Preferably, the second lens L2 may have biconvex shape.

It is preferable that the third lens L3 be a biconcave lens. In this case, the third lens L3 can have a strong negative power, and it is possible to effectively correct longitudinal chromatic aberration.

It is preferable that the absolute value of the curvature radius of an object-side surface of the fourth lens L4 be greater than the absolute value of the curvature radius of an image-side surface thereof. In this case, it is possible to effectively correct the field curvature. Preferably, the fourth lens L4 may have planar concave shape or meniscus shape.

It is preferable that the fifth lens L5 be a biconvex lens and the sixth lens L6 be a biconcave lens or a meniscus lens having a concave surface facing the object side. The fifth lens L5 and the sixth lens L6 having the above-mentioned shapes make is possible to effectively correct lateral chromatic aberration and field curvature.

It is preferable that the imaging lenses according to the first and second embodiments of the invention satisfy the following Conditional expressions 2 to 13. Preferably, the imaging lenses satisfy any one of the following Conditional expressions 2 to 13 or any combinations thereof:

| | |
|---|---|
| f3456/f>0.8, | [Conditional expression 2] |
| 0.6<f5/f<1.2, | [Conditional expression 3] |
| −2.0<f6/f<−0.6, | [Conditional expression 4] |
| −1.5<f3/f<−0.5, | [Conditional expression 5] |
| −1.2<R9/f<−0.5, | [Conditional expression 6] |
| 0.5<f4/f5<1.5, | [Conditional expression 7] |
| 2.0<L/f<4.5, | [Conditional expression 8] |
| 0.2<Bf/f<1.5, | [Conditional expression 9] |
| 1.0<f56/f, | [Conditional expression 10] |
| 1.0<|f34/f|, | [Conditional expression 11] |
| 1.0<R1/f<2.0, | [Conditional expression 12] |
| and | |
| D11/f<3.0 | [Conditional expression 13] |

(where R1 indicates the curvature radius of the object-side surface of the first lens L1, R9 indicates the curvature radius of the image-side surface of the fourth lens L4, D11 indicates the air space between the fifth lens L5 and the sixth lens L6 on the optical axis, f indicates the focal length of the entire lens system, f3 indicates the focal length of the third lens L3, f4 indicates the focal length of the fourth lens L4, f5 indicates the focal length of the fifth lens L5, f6 indicates the focal length of the sixth lens L6, f34 indicates a composite focal length of the third lens L3 and the fourth lens L4, f56 indicates a composite focal length of the fifth lens L5 and the sixth lens L6, f3456 indicates a composite focal length from the third lens L3 to the sixth lens L6, L indicates the distance from an object-side surface of a lens closest to the object side to the image surface on the optical axis Z (a back focal length is an air equivalent length), and Bf indicates the distance from an image-side surface of a lens closest to the image side to the image surface on the optical axis Z (corresponding to the back focal length, which is an air equivalent length)).

If the ratio is less than the lower limit of Conditional expression 2, it is difficult to correct field curvature, and a back focal length is reduced. As a result, it is difficult to insert various filters or a cover glass between the lens system and the image surface.

If the radio is greater than the upper limit of Conditional expression 3, it is difficult to correct spherical aberration. If the radio is less than the lower limit of Conditional expression 3, it is difficult to correct field curvature.

If the radio is greater than the upper limit of Conditional expression 4, it is difficult to correct field curvature. If the radio is less than the lower limit of Conditional expression 4, it is difficult to correct spherical aberration.

If the radio is greater than the upper limit of Conditional expression 5, the power of the third lens L3 is excessively increased, and a large performance variation occurs due to eccentricity. Therefore, the tolerance of a manufacturing error and an assembly error is reduced. As a result, it is difficult to assemble an imaginary apparatus, and manufacturing costs increase. If the ratio is less than the lower limit of Conditional expression 5, the power of the third lens is reduced, and it is difficult to correct longitudinal chromatic aberration.

If the radio is greater than the upper limit of Conditional expression 6, it is difficult to effectively correct field curvature. If the ratio is less than the lower limit of Conditional expression 6, it is difficult to effectively correct spherical aberration.

When Conditional expression 7 is satisfied, the positive power of the imaging lens is appropriately distributed. Therefore, it is possible to increase the tolerance of the manufacturing error and the assembly error of a positive lens and effectively correct spherical aberration. If the radio is greater than the upper limit of Conditional expression 7, the tolerance of the manufacturing error and the assembly error of the fifth lens L5 is reduced, and it is difficult to effectively correct spherical aberration. If the ratio is less than the lower limit of Conditional expression 7, the tolerance of the manufacturing error and the assembly error of the fourth lens is reduced, and it is difficult to correct field curvature. In addition, the power of the fifth lens L5 is reduced, and it is difficult to correct lateral chromatic aberration.

If the radio is greater than the upper limit of Conditional expression 8, the total length of the lens system is increased in the optical axis direction, which results in an increase in the size of an imaging apparatus. If the ratio is less than the lower limit of Conditional expression 8, the focal length of the entire lens system is excessively large, and it is difficult to increase an angle of view.

If the radio is greater than the upper limit of Conditional expression 9, the back focal length is excessively large, which results in an increase in the size of the entire lens system. If the ratio is less than the lower limit of Conditional expression 9, the back focal length is excessively small. Therefore, it is difficult to provide various filters or a cover glass between the lens system and the image surface.

If the ratio is less than the lower limit of Conditional expression 10, it is difficult to effectively correct field curvature.

If the absolute value is less than the lower limit of Conditional expression 11, it is difficult to correct field curvature.

If the ratio satisfies the upper limit of Conditional expression 12, it is easy to correct distortion. If the ratio is less than the lower limit of Conditional expression 12, the curvature radius of the image-side surface of the first lens L1 for increasing an angle of view is reduced. Therefore, it is difficult to process the lens system, which results in an increase in manufacturing costs.

If the ratio is greater than the upper limit of Conditional expression 13, the distance between the fifth lens L5 and the sixth lens L6 is excessively large, which results in an increase in the size of a lens system.

It is more preferable that the imaging lenses according to the first and second embodiments of the invention satisfy Conditional expressions 1-1 to 13-1 given below:

| $|R3r/R4f|<0.9$, | [Conditional expressions 1-1] |
|---|---|
| $1.0<f3456/f<2.0$, | [Conditional expressions 2-1] |
| $0.7<f5/f<1.15$, | [Conditional expressions 3-1] |
| $-1.8<f6/f<-0.7$, | [Conditional expressions 4-1] |
| $-1.3<f3/f<-0.6$, | [Conditional expressions 5-1] |
| $-1.1<R9/f<-0.6$, | [Conditional expressions 6-1] |
| $0.6<f4/f5<1.3$, | [Conditional expressions 7-1] |
| $2.2<L/f<4.0$, | [Conditional expressions 8-1] |
| $0.3<Bf/f<1.2$, | [Conditional expressions 9-1] |
| $1.5<f56/f<25$, | [Conditional expressions 10-1] |
| $1.6<|f34/f|<27.0$, | [Conditional expressions 11-1] |
| $1.2<R1/f<1.8$, | [Conditional expressions 12-1] |
| and | |
| $0.1<D11/f<2.5$. | [Conditional expressions 13-1] |

If the absolute value satisfies the upper limit of Conditional expression 1-1, it is possible to more effectively correct field curvature.

If the ratio satisfies the upper limit of Conditional expression 2-1, it is easy to increase the back focal length. If the ratio satisfies the lower limit of Conditional expression 2-1, it is possible to more effectively correct field curvature.

If the ratio satisfies the upper limit of Conditional expression 3-1, it is possible to more effectively correct spherical aberration If the ratio satisfies the lower limit of Conditional expression 3-1, it is possible to more effectively correct field curvature.

If the ratio satisfies the upper limit of Conditional expression 4-1, it is possible to more effectively correct field curvature. If the ratio satisfies the lower limit of Conditional expression 4-1, it is possible to more effectively correct spherical aberration.

If the ratio satisfies the upper limit of Conditional expression 5-1, it is possible to increase the tolerance of the manufacturing error and the assembly error of the third lens L3, and it is easier to assemble a lens. If the ratio satisfies the lower limit of Conditional expression 5-1, it is possible to more effectively correct longitudinal chromatic aberration.

If the ratio satisfies the upper limit of Conditional expression 6-1, it is possible to more effectively correct field curvature. If the ratio satisfies the lower limit of Conditional expression 6-1, it is possible to more effectively correct spherical aberration.

If the ratio satisfies the upper limit of Conditional expression 7-1, it is possible to increase the tolerance of the manufacturing error and the assembly error of a positive lens, and it is possible to more effectively correct spherical aberration. If the ratio satisfies the lower limit of Conditional expression 7-1, it is possible to increase the tolerance of the manufacturing error and the assembly error of the positive lens, and it is possible to more effectively correct field curvature.

If the ratio satisfies the upper limit of Conditional expression 8-1, it is possible to further reduce the size of a lens system. If the ratio satisfies the lower limit of Conditional expression 8-1, it is easy to increase an angle of view.

It is preferable that L be equal to or less than 24 mm in order to reduce the size of a lens system. In addition, it is preferable that f be equal to or less than 9 mm in order to increase the angle of view of a lens system.

If the ratio satisfies the upper limit of Conditional expression 9-1, it is easier to reduce the size of a lens system. If the ratio satisfies the lower limit of Conditional expression 9-1, it is easier to provide, for example, various filters and a cover glass.

If the ratio satisfies the upper limit of Conditional expression 10-1, it is easy to effectively correct spherical aberration. If the ratio satisfies the lower limit of Conditional expression 10-1, it is possible to more effectively correct field curvature.

If the absolute value satisfies the upper limit of Conditional expression 11-1, it is easy to effectively correct spherical aberration. If the absolute value satisfies the lower limit of Conditional expression 11-1, it is possible to more effectively correct field curvature.

If the ratio satisfies the upper limit of Conditional expression 12-1, it is easier to correct distortion. If the ratio satisfies the lower limit of Conditional expression 12-1, it is easier to process the first lens.

If the ratio satisfies the upper limit of Conditional expression 13-1, it is possible to further reduce the size of a lens system. If the ratio satisfies the lower limit of Conditional expression 13-1, it is easy to correct comatic aberration.

It is preferable that the Abbe number of each lens with respect to the d-line be set as follows. The Abbe number of any one of the lenses may be set as follows, or any combination of the Abbe numbers of the lenses may be set as follows.

It is preferable that the Abbe number of the first lens L1 with respect to the d-line be equal to or greater than 40. In this case, it is easy to prevent the occurrence of chromatic aberration and thus achieve a high optical performance.

If the Abbe number of the first lens L1 with respect to the d-line be equal to or greater than 49, it is easier to prevent the occurrence of chromatic aberration and thus achieve a high optical performance.

It is preferable that the Abbe number of the second lens L2 with respect to the d-line be greater than 32. If the Abbe number of the second lens L2 with respect to the d-line is equal to or less than 32, it is difficult to effectively correct longitudinal chromatic aberration.

It is preferable that the Abbe number of the third lens L3 with respect to the d-line be less than 30. In this case, it is easy to prevent the occurrence of longitudinal chromatic aberration and thus achieve a high optical performance.

It is preferable that the Abbe number of the third lens L3 with respect to the d-line be less than 25. In this case, it is easy to prevent the occurrence of longitudinal chromatic aberration and thus achieve a high optical performance.

It is preferable that the Abbe number of the third lens L3 with respect to the d-line be less than 20. In this case, it is easy to prevent the occurrence of longitudinal chromatic aberration and thus achieve a high optical performance.

It is preferable that the Abbe number of each of the fourth lens L4 and the fifth lens L5 with respect to the d-line be equal to or greater than 35. In this case, it is easy to prevent the occurrence of chromatic aberration and thus achieve a high optical performance.

If the Abbe number of each of the fourth lens L4 and the fifth lens L5 with respect to the d-line is equal to or greater than 50, it is easy to prevent the occurrence of chromatic aberration and thus achieve a high optical performance.

It is preferable that the Abbe number of the sixth lens L6 with respect to the d-line be equal to or less than 30. In this case, it is possible to effectively correct longitudinal chromatic aberration and lateral chromatic aberration.

If the Abbe number of the sixth lens L6 with respect to the d-line is equal to or less than 28, it is possible to more effectively correct longitudinal chromatic aberration and lateral chromatic aberration.

It is preferable that the Abbe number of the sixth lens L6 with respect to the d-line be equal to or less than 20. In this case, it is possible to further effectively correct longitudinal chromatic aberration and lateral chromatic aberration.

For example, when the imaging lens is used in a severe environment, such as in an in-vehicle camera, it is preferable that the first lens L1 arranged closest to the object side be made of a material capable of preventing the deterioration of the surface of the lens due to rain and wind and a temperature variation due to direct lays of the sun, and having high resistance to chemicals, such as oils, fats, and a detergent, that is, a material having high water resistance, high weather resistance, high acid resistance, and high chemical resistance. In addition, it is preferable that the first lens L1 arranged closest to the object side be made of a hard and splinterless material. Specifically, it is preferable that the first lens L1 be made of glass or transparent ceramics. The strength and heat resistance of the ceramics are higher than those of general glass.

It is preferable that the thickness D1 of the center of the first lens L1 be equal to or greater than 1 mm. If the thickness D1 of the center of the first lens is equal to or greater than 1 mm, the first lens L1 is less likely to be cracked.

When the imaging lens is applied to, for example, an in-vehicle camera, the imaging lens 1 needs to be used in a wide temperature range in the vehicle from a low temperature in a cold region to a high temperature in a tropical region. When the imaging lens 1 is used in the wide temperature range, the lens is preferably made of a material having a small linear expansion coefficient. When the imaging lens is required to be used in a wide temperature range as in the in-vehicle camera, all the lenses are preferably made of glass.

In addition, it is preferable that the first lens L1 have a waterproof structure to cut the flow of air to the outside such that the inside of the imaging lens is not clouded due to rapid temperature and humidity variations. As the waterproof structure, any of the following structures may be used: a sealing structure in which the first lens L1 is closely adhered to a lens frame; and a sealing structure in which an O-ring is inserted between the first lens L1 and the lens barrel.

When the lens system is used in severe temperature and humidity environments, it is preferable that a cemented lens be not used for the lens system. For example, in the structural example shown in FIG. 1, each of the lenses is a single lens, and a cemented lens is not used in the entire lens system.

It is preferable that all the lenses be spherical lenses in order to manufacture the lenses with a low cost. Alternatively, all the lenses may be aspheric lenses in order to improve the performance, for example, to more effectively correct each aberration. The lens may be made of plastic in order to accurately form an aspheric surface with a low cost.

There is a concern that a light beam passing through portions of the lenses other than an effective aperture between the lenses will be incident as stray light on the image surface and serve as a ghost. Therefore, it is preferable to provide a light shielding unit that shields the stray light, if necessary. As the light shielding unit, for example, an opaque pigment may be coated on a portion of the surface of the lens other than the effective aperture, or an opaque plate may be provided. Alternatively, an opaque plate may be provided in the optical path of a light beam, serving as stray light, thereby forming a light shielding unit. Alternatively, for example, a hood that shields the stray light may be provided on the object side of the lens closest to the object side. For example, in FIGS. 1 and 2, the light shielding unit 11 is provided on the image-side surface of the first lens L1, but the position of the light shielding unit is not limited to that shown in FIGS. 1 and 2. The light shielding unit may be provided on the surfaces of other lenses or between the lenses.

In addition, an aperture diaphragm that shields a marginal ray may be provided between the lenses. The marginal ray means a light beam passing through a peripheral portion of the entrance pupil of the optical system, among light beams from an object point out of the optical axis Z. It is possible to improve image quality in the periphery of an imaging region by shielding the marginal ray in the range in which relative illumination is practically available. In addition, it is possible to reduce the ghost by shielding light causing the ghost with the aperture diaphragm.

Next, detailed numerical examples of the imaging lens according to the invention will be described. FIGS. 3 to 14 show examples of the structures of imaging lenses according to Examples 1 to 12, respectively. In FIGS. 3 to 14, the left side is an object side, and the right side is an image side. Similar to FIG. 1, FIGS. 3 to 14 also show an aperture diaphragm St, an optical member PP, and an imaging device 5 that is arranged on an image surface including an imaging position Pim. FIGS. 3 to 14 do not show the shape or size of the aperture diaphragm St, but show the position of the aperture diaphragm St on the optical axis Z. In the diagrams illustrating the structures of the lenses according to Examples 1 to 12, Ri and Di (i=1, 2, 3, . . . ) correspond to Ri and Di in lens data, which will be described below. In addition, R7 and R8 shown in FIGS. 3 to 10 correspond to R3r and R4f used in Conditional expression 1, and R6 and R8 shown in FIGS. 11 to 14 correspond to R3r and R4f used in Conditional expression 1.

The lens data of the imaging lenses according to Examples 1 to 12 and other various data are shown in Tables 1 to 12. The meaning of symbols in the tables will be described below using Example 1 as an example, which is basically the same with the other examples.

In the lens data shown in Table 1, Si indicates an i-th (i=1, 2, 3, . . . ) surface number. In this case, the surface of a component closest to the object side is given number 1, and the surface number is sequentially increased toward the image side. In addition, the lens data shown in Table 1 includes the aperture diaphragm St and the optical member PP, and '(Aperture diaphragm)' is written in the field of the surface number corresponding to the aperture diaphragm St.

In Table 1, Ri indicates the curvature radius of the i-th (i=1, 2, 3, . . . ) surface, and Di indicates the surface spacing between the i-th (i=1, 2, 3, . . . ) surface and an (i+1)-th surface on the optical axis Z. In addition, Ndj indicates the refractive index of a j-th (j=1, 2, 3, . . . ) optical component from the object side with respect to the d-line. In this case, an optical component arranged closest to the object side is given number 1, and the number is sequentially increased toward the image side. In addition, vdj indicates the Abbe number of the j-th optical component with respect to the d-line. In Table 1, when the lens surface is convex toward the object side, the curvature radius thereof has a positive value. When the lens surface is convex toward the image side, the curvature radius thereof has a negative value.

In various data shown in Table 1, Fno. indicates an F number, 2ω indicates a total angle of view, L indicates the distance from the object-side surface of the first lens L1 to the image surface on the optical axis Z (back focal length, which is an air equivalent length), Bf indicates the back focal length (air equivalent length), f indicates the focal length of the entire lens system, f1 indicates the focal length of the first lens L1, f2 indicates the focal length of the second lens L2, f3 indicates the focal length of the third lens L3, f4 indicates the focal length of the fourth lens L4, f5 indicates the focal length of the fifth lens L5, f6 indicates the focal length of the sixth lens L6, f34 indicates a composite focal length of the third lens L3 and the fourth lens L4, f56 indicates a composite focal length of the fifth lens L5 and the sixth lens L6, and f3456 indicates a composite focal length from the third lens L3 to the sixth lens L6 (a composite focal length of the third lens L3, the fourth lens L4, the fifth lens L5, and the sixth lens L6).

In addition, numerical values rounded to a predetermined decimal place are written in Table 1. In various data shown in Table 1, the unit of 2ω is degree. In Table 1, the units of the curvature radius and the surface spacing are millimeter (mm). In addition, in Table 1, the units of L, Bf, each focal length, and each composite focal length are millimeter (mm). However, the optical system has the same optical performance even when proportional magnification or proportional reduction is performed. Therefore, the unit is not limited to millimeter (mm), but other appropriate units may be used.

TABLE 1

Example 1

Lens data

| Si | Ri | Di | Ndj | vdj |
|---|---|---|---|---|
| 1 | 10.00 | 1.50 | 1.5168 | 64.2 |
| 2 | 3.42 | 0.65 | | |
| 3 | 5.49 | 2.72 | 1.8348 | 42.7 |
| 4 | −30.44 | 0.50 | | |
| 5 (Aperture diaphragm) | | 0.40 | | |
| 6 | −9.61 | 1.00 | 1.9229 | 18.9 |
| 7 | 17.59 | 0.35 | | |
| 8 | −24.23 | 2.25 | 1.8348 | 42.7 |
| 9 | −4.81 | 0.10 | | |
| 10 | 7.85 | 3.00 | 1.8348 | 42.7 |
| 11 | −17.56 | 0.30 | | |
| 12 | −8.81 | 0.87 | 1.7847 | 26.3 |
| 13 | 11.64 | 1.53 | | |
| 14 | ∞ | 1.00 | 1.5168 | 64.2 |
| 15 | ∞ | 1.00 | | |
| Image surface | — | | | |

Various data

| | |
|---|---|
| Fno. | 1.85 |
| 2ω | 42.6 |
| L | 16.8 |
| Bf | 3.2 |
| f | 7.00 |
| $f_1$ | −10.89 |
| $f_2$ | 5.77 |
| $f_3$ | −6.62 |
| $f_4$ | 6.83 |
| $f_5$ | 6.86 |
| $f_6$ | −6.27 |
| $f_{34}$ | 23.48 |
| $f_{56}$ | 38.86 |
| $f_{3456}$ | 11.39 |

TABLE 2

Example 2

Lens data

| Si | Ri | Di | Ndj | vdj |
|---|---|---|---|---|
| 1 | 10.00 | 1.00 | 1.5168 | 64.2 |
| 2 | 3.42 | 1.30 | | |
| 3 | 11.38 | 2.50 | 1.8980 | 34.0 |
| 4 | 799.93 | 0.75 | | |
| 5 (Aperture diaphragm) | | 1.05 | | |
| 6 | −9.78 | 1.20 | 1.8467 | 23.8 |
| 7 | 15.86 | 0.57 | | |
| 8 | 153.43 | 3.00 | 1.8348 | 42.7 |
| 9 | −5.93 | 0.10 | | |
| 10 | 7.79 | 3.50 | 1.7130 | 53.9 |
| 11 | −9.08 | 0.20 | | |
| 12 | −8.56 | 0.80 | 1.9229 | 18.9 |
| 13 | −171.60 | 4.34 | | |
| 14 | ∞ | 0.70 | 1.5168 | 64.2 |
| 15 | ∞ | 1.00 | | |
| Image surface | — | | | |

TABLE 2-continued

Example 2

Various data

| | |
|---|---|
| Fno. | 1.50 |
| 2ω | 55.0 |
| L | 21.8 |
| Bf | 5.8 |
| f | 5.72 |
| $f_1$ | −10.60 |
| $f_2$ | 12.84 |
| $f_3$ | −6.99 |
| $f_4$ | 6.90 |
| $f_5$ | 6.44 |
| $f_6$ | −9.78 |
| $f_{34}$ | 18.21 |
| $f_{56}$ | 13.32 |
| $f_{3456}$ | 6.24 |

TABLE 3

Example 3

Lens data

| Si | Ri | Di | Ndj | vdj |
|---|---|---|---|---|
| 1 | 13.56 | 1.20 | 1.5168 | 64.2 |
| 2 | 3.96 | 0.88 | | |
| 3 | 8.23 | 3.55 | 1.8340 | 37.2 |
| 4 | −41.19 | 0.68 | | |
| 5 (Aperture diaphragm) | | 0.55 | | |
| 6 | −12.89 | 1.18 | 1.9229 | 18.9 |
| 7 | 14.86 | 0.27 | | |
| 8 | 20.44 | 3.05 | 1.8348 | 42.7 |
| 9 | −6.28 | 0.14 | | |
| 10 | 13.88 | 4.07 | 1.8348 | 42.7 |
| 11 | −14.49 | 0.41 | | |
| 12 | −8.36 | 1.46 | 1.7847 | 26.3 |
| 13 | 23.34 | 2.65 | | |
| 14 | ∞ | 1.00 | 1.5168 | 64.2 |
| 15 | ∞ | 1.00 | | |
| Image surface | — | | | |

Various data

| | |
|---|---|
| Fno. | 2.00 |
| 2ω | 50.0 |
| L | 21.7 |
| Bf | 4.3 |
| f | 8.11 |
| $f_1$ | −11.30 |
| $f_2$ | 8.50 |
| $f_3$ | −7.33 |
| $f_4$ | 6.07 |
| $f_5$ | 9.08 |
| $f_6$ | −7.69 |
| $f_{34}$ | 13.96 |
| $f_{56}$ | 159.41 |
| $f_{3456}$ | 10.41 |

TABLE 4

Example 4

Lens data

| Si | Ri | Di | Ndj | vdj |
|---|---|---|---|---|
| 1 | 13.56 | 1.20 | 1.5168 | 64.2 |
| 2 | 4.10 | 0.73 | | |
| 3 | 6.34 | 3.00 | 1.8340 | 37.2 |
| 4 | −62.45 | 0.68 | | |
| 5 (Aperture diaphragm) | | 0.54 | | |
| 6 | −19.50 | 1.00 | 1.9229 | 18.9 |
| 7 | 12.89 | 0.40 | | |
| 8 | −23.84 | 3.05 | 1.8348 | 42.7 |
| 9 | −5.88 | 0.14 | | |
| 10 | 9.72 | 3.71 | 1.8348 | 42.7 |
| 11 | −11.19 | 1.50 | 1.7847 | 26.3 |
| 12 | 11.60 | 2.66 | | |
| 13 | ∞ | 1.00 | 1.5168 | 64.2 |
| 14 | ∞ | 1.00 | | |
| Image surface | — | | | |

Various data

| | |
|---|---|
| Fno. | 2.00 |
| 2ω | 49.6 |
| L | 20.3 |
| Bf | 4.3 |
| f | 8.17 |
| $f_1$ | −11.90 |
| $f_2$ | 7.04 |
| $f_3$ | −8.29 |
| $f_4$ | 8.68 |
| $f_5$ | 6.78 |
| $f_6$ | −7.06 |
| $f_{34}$ | 31.85 |
| $f_{56}$ | 25.71 |
| $f_{3456}$ | 11.24 |

TABLE 5

Example 5

Lens data

| Si | Ri | Di | Ndj | vdj |
|---|---|---|---|---|
| 1 | 13.56 | 1.20 | 1.5168 | 64.2 |
| 2 | 4.83 | 1.15 | | |
| 3 | 6.88 | 3.00 | 1.8348 | 42.7 |
| 4 | −40.16 | 0.74 | | |
| 5 (Aperture diaphragm) | | 0.54 | | |
| 6 | −9.30 | 1.01 | 1.9229 | 18.9 |
| 7 | 14.08 | 0.40 | | |
| 8 | −21.50 | 3.05 | 1.8348 | 42.7 |
| 9 | −6.23 | 0.14 | | |
| 10 | 10.11 | 4.08 | 1.8348 | 42.7 |
| 11 | −14.87 | 1.50 | 1.7847 | 26.3 |
| 12 | 30.53 | 3.51 | | |
| 13 | ∞ | 1.00 | 1.5168 | 64.2 |
| 14 | ∞ | 1.00 | | |
| Image surface | — | | | |

Various data

| | |
|---|---|
| Fno. | 2.00 |
| 2ω | 46.2 |
| L | 22.0 |
| Bf | 5.2 |
| f | 8.88 |
| $f_1$ | −15.23 |
| $f_2$ | 7.24 |
| $f_3$ | −6.48 |
| $f_4$ | 9.64 |
| $f_5$ | 7.79 |
| $f_6$ | −10.67 |
| $f_{34}$ | −221.82 |
| $f_{56}$ | 18.21 |
| $f_{3456}$ | 13.48 |

TABLE 6

Example 6

Lens data

| Si | Ri | Di | Ndj | vdj |
|---|---|---|---|---|
| 1 | 7.64 | 2.00 | 1.7550 | 52.3 |
| 2 | 3.17 | 1.24 | | |
| 3 | 7.24 | 2.60 | 1.8348 | 42.7 |
| 4 | −11.19 | 0.20 | | |
| 5 (Aperture diaphragm) | | 0.40 | | |
| 6 | −6.95 | 0.80 | 1.7618 | 26.5 |
| 7 | 6.95 | 0.45 | | |
| 8 | 17.96 | 2.80 | 1.7550 | 52.3 |
| 9 | −5.34 | 0.10 | | |
| 10 | 10.26 | 3.50 | 1.8040 | 46.6 |
| 11 | −8.06 | 0.99 | | |
| 12 | −6.04 | 0.80 | 1.9229 | 18.9 |
| 13 | −69.44 | 1.69 | | |
| 14 | ∞ | 0.50 | 1.5168 | 64.2 |
| 15 | ∞ | 1.00 | | |
| Image surface | — | | | |

Various data

| | |
|---|---|
| Fno. | 2.00 |
| 2ω | 58.0 |
| L | 18.9 |
| Bf | 3.0 |
| f | 5.83 |
| $f_1$ | −8.89 |
| $f_2$ | 5.62 |
| $f_3$ | −4.45 |
| $f_4$ | 5.75 |
| $f_5$ | 6.14 |
| $f_6$ | −7.21 |
| $f_{34}$ | 38.20 |
| $f_{56}$ | 14.94 |
| $f_{3456}$ | 7.90 |

TABLE 7

Example 7

Lens data

| Si | Ri | Di | Ndj | vdj |
|---|---|---|---|---|
| 1 | 8.20 | 2.00 | 1.7550 | 52.3 |
| 2 | 3.19 | 1.15 | | |
| 3 | 9.09 | 2.50 | 1.8830 | 40.8 |
| 4 | −14.81 | 0.25 | | |
| 5 (Aperture diaphragm) | | 0.70 | | |
| 6 | −9.89 | 0.80 | 1.8052 | 25.4 |
| 7 | 9.89 | 0.45 | | |
| 8 | ∞ | 2.90 | 1.7550 | 52.3 |
| 9 | −5.27 | 0.15 | | |
| 10 | 8.87 | 3.13 | 1.7550 | 52.3 |
| 11 | −8.87 | 1.00 | | |
| 12 | −7.13 | 0.80 | 1.9229 | 18.9 |
| 13 | −69.27 | 2.07 | | |
| 14 | ∞ | 1.20 | 1.5168 | 64.2 |
| 15 | ∞ | 1.00 | | |
| Image surface | — | | | |

Various data

| | |
|---|---|
| Fno. | 2.00 |
| 2ω | 58.0 |
| L | 23.2 |
| Bf | 3.9 |
| f | 5.89 |
| $f_1$ | −8.35 |
| $f_2$ | 6.71 |
| $f_3$ | −6.03 |
| $f_4$ | 6.97 |
| $f_5$ | 6.36 |

TABLE 7-continued

Example 7

| | |
|---|---|
| $f_6$ | −8.67 |
| $f_{34}$ | 30.43 |
| $f_{56}$ | 13.05 |
| $f_{3456}$ | 6.97 |

TABLE 8

Example 8

Lens data

| Si | Ri | Di | Ndj | vdj |
|---|---|---|---|---|
| 1 | 8.11 | 2.00 | 1.7725 | 49.6 |
| 2 | 3.03 | 1.15 | | |
| 3 | 10.98 | 2.50 | 1.8830 | 40.8 |
| 4 | −17.03 | 0.25 | | |
| 5 (Aperture diaphragm) | | 0.70 | | |
| 6 | −13.49 | 1.20 | 1.8467 | 23.8 |
| 7 | 11.16 | 0.49 | | |
| 8 | ∞ | 2.90 | 1.7550 | 52.3 |
| 9 | −5.37 | 0.15 | | |
| 10 | 8.87 | 3.50 | 1.7550 | 52.3 |
| 11 | −8.87 | 1.00 | | |
| 12 | −7.00 | 0.80 | 1.9229 | 18.9 |
| 13 | −73.60 | 3.35 | | |
| 14 | ∞ | 0.40 | 1.5168 | 64.2 |
| 15 | ∞ | 0.60 | | |
| Image surface | — | | | |

Various data

| | |
|---|---|
| Fno. | 2.00 |
| 2ω | 53.6 |
| L | 20.3 |
| Bf | 4.3 |
| f | 5.70 |
| $f_1$ | −7.57 |
| $f_2$ | 7.89 |
| $f_3$ | −7.06 |
| $f_4$ | 7.11 |
| $f_5$ | 6.42 |
| $f_6$ | −8.43 |
| $f_{34}$ | 21.12 |
| $f_{56}$ | 13.34 |
| $f_{3456}$ | 6.44 |

TABLE 9

Example 9

Lens data

| Si | Ri | Di | Ndj | vdj |
|---|---|---|---|---|
| 1 | 10.00 | 1.50 | 1.5168 | 64.2 |
| 2 | 3.50 | 0.71 | | |
| 3 | 5.41 | 2.86 | 1.8348 | 42.7 |
| 4 | −35.44 | 0.90 | | |
| 5 | −8.84 | 0.97 | 1.9229 | 18.9 |
| 6 | 17.41 | 0.15 | | |
| 7 (Aperture diaphragm) | | 0.20 | | |
| 8 | −43.21 | 2.25 | 1.8348 | 42.7 |
| 9 | −4.96 | 0.10 | | |
| 10 | 7.51 | 2.87 | 1.8348 | 42.7 |
| 11 | −18.22 | 0.30 | | |
| 12 | −8.52 | 0.80 | 1.7847 | 26.3 |
| 13 | 11.11 | 1.47 | | |
| 14 | ∞ | 1.00 | 1.5168 | 64.2 |
| 15 | ∞ | 1.00 | | |
| Image surface | — | | | |

TABLE 9-continued

Example 9

Various data

| | |
|---|---|
| Fno. | 1.80 |
| 2ω | 42.6 |
| L | 16.8 |
| Bf | 3.2 |
| f | 6.99 |
| $f_1$ | −11.33 |
| $f_2$ | 5.81 |
| $f_3$ | −6.24 |
| $f_4$ | 6.54 |
| $f_5$ | 6.71 |
| $f_6$ | −6.04 |
| $f_{34}$ | 23.52 |
| $f_{56}$ | 41.20 |
| $f_{3456}$ | 11.64 |

TABLE 10

Example 10

Lens data

| Si | Ri | Di | Ndj | νdj |
|---|---|---|---|---|
| 1 | 7.64 | 2.00 | 1.7550 | 52.3 |
| 2 | 3.17 | 1.24 | | |
| 3 | 7.24 | 2.60 | 1.8348 | 42.7 |
| 4 | −11.19 | 0.60 | | |
| 5 | −6.95 | 0.80 | 1.7618 | 26.5 |
| 6 | 6.95 | 0.35 | | |
| 7 (Aperture diaphragm) | | 0.10 | | |
| 8 | 17.96 | 2.80 | 1.7550 | 52.3 |
| 9 | −5.34 | 0.10 | | |
| 10 | 10.26 | 3.50 | 1.8040 | 46.6 |
| 11 | −8.06 | 0.99 | | |
| 12 | −6.04 | 0.80 | 1.9229 | 18.9 |
| 13 | −69.44 | 1.69 | | |
| 14 | ∞ | 0.50 | 1.5168 | 64.2 |
| 15 | ∞ | 1.00 | | |
| Image surface | — | | | |

Various data

| | |
|---|---|
| Fno. | 2.00 |
| 2ω | 57.8 |
| L | 18.9 |
| Bf | 3.0 |
| f | 5.83 |
| $f_1$ | −8.89 |
| $f_2$ | 5.62 |
| $f_3$ | −4.45 |
| $f_4$ | 5.75 |
| $f_5$ | 6.14 |
| $f_6$ | −7.21 |
| $f_{34}$ | 38.20 |
| $f_{56}$ | 14.94 |
| $f_{3456}$ | 7.90 |

TABLE 11

Example 11

Lens data

| Si | Ri | Di | Ndj | νdj |
|---|---|---|---|---|
| 1 | 8.20 | 2.00 | 1.7550 | 52.3 |
| 2 | 3.19 | 1.15 | | |
| 3 | 9.09 | 2.50 | 1.8830 | 40.8 |
| 4 | −14.81 | 0.95 | | |
| 5 | −9.89 | 0.80 | 1.8052 | 25.4 |
| 6 | 9.89 | 0.45 | | |
| 7 (Aperture diaphragm) | | 0.00 | | |
| 8 | ∞ | 2.90 | 1.7550 | 52.3 |
| 9 | −5.27 | 0.15 | | |
| 10 | 8.87 | 3.13 | 1.7550 | 52.3 |
| 11 | −8.87 | 1.00 | | |
| 12 | −7.13 | 0.80 | 1.9229 | 18.9 |
| 13 | −69.27 | 2.07 | | |
| 14 | ∞ | 1.20 | 1.5168 | 64.2 |
| 15 | ∞ | 1.00 | | |
| Image surface | — | | | |

Various data

| | |
|---|---|
| Fno. | 2.00 |
| 2ω | 57.8 |
| L | 23.2 |
| Bf | 3.9 |
| f | 5.89 |
| $f_1$ | −8.35 |
| $f_2$ | 6.71 |
| $f_3$ | −6.03 |
| $f_4$ | 6.97 |
| $f_5$ | 6.36 |
| $f_6$ | −8.67 |
| $f_{34}$ | 30.43 |
| $f_{56}$ | 13.05 |
| $f_{3456}$ | 6.97 |

TABLE 12

Example 12

Lens data

| Si | Ri | Di | Ndj | νdj |
|---|---|---|---|---|
| 1 | 8.11 | 2.00 | 1.7725 | 49.6 |
| 2 | 3.03 | 1.15 | | |
| 3 | 10.98 | 2.50 | 1.8830 | 40.8 |
| 4 | −17.03 | 0.95 | | |
| 5 | −13.49 | 1.20 | 1.8467 | 23.8 |
| 6 | 11.16 | 0.45 | | |
| 7 (Aperture diaphragm) | | 0.04 | | |
| 8 | ∞ | 2.90 | 1.7550 | 52.3 |
| 9 | −5.37 | 0.15 | | |
| 10 | 8.87 | 3.50 | 1.7550 | 52.3 |
| 11 | −8.87 | 1.00 | | |
| 12 | −7.00 | 0.80 | 1.9229 | 18.9 |
| 13 | −73.60 | 3.35 | | |
| 14 | ∞ | 0.40 | 1.5168 | 64.2 |
| 15 | ∞ | 0.60 | | |
| Image surface | — | | | |

Various data

| | |
|---|---|
| Fno. | 2.00 |
| 2ω | 53.6 |
| L | 20.3 |
| Bf | 4.3 |
| f | 5.70 |
| $f_1$ | −7.57 |
| $f_2$ | 7.89 |
| $f_3$ | −7.06 |
| $f_4$ | 7.11 |
| $f_5$ | 6.42 |
| $f_6$ | −8.43 |
| $f_{34}$ | 21.12 |
| $f_{56}$ | 13.34 |
| $f_{3456}$ | 6.44 |

In Example 4, the fifth lens L5 and the sixth lens L6 are bonded to each other. A cemented lens of the fifth lens L5 and the sixth lens L6 arranged closest to the image side makes it easy to effectively correct lateral chromatic aberration.

The bonding surface has a reflectance lower than an air contact surface. Therefore, even when a ghost is generated due to light reflection from the image-side surface of the fifth lens L5 and the object-side surface of the sixth lens L6, the intensity of the ghost is lower than that when the bonding surface is not provided. As a result, it is possible to reduce the influence of the ghost on an image. In particular, the ghost generated due to light reflection from a lens surface close to the image surface has high intensity, and is likely to have an adverse influence on an image. Therefore, it is effective to form the bonding surface between the fifth lens L5 and the sixth lens L6 close to the image surface.

In Example 5, similar to Example 4, the fifth lens L5 and the sixth lens L6 are bonded to each other. Therefore, it is possible to obtain the same effects as those of the cemented lens according to Example 4.

The imaging lens according to Example 6 has a structure capable of more effectively preventing the ghost. In Example 1, the sixth lens L6 is a biconcave shape. However, in Example 6, the sixth lens L6 is a negative meniscus lens having a convex surface facing the image side. When a light component that is sequentially reflected from the imaging device 5 and the image-side surface of the sixth lens and is then incident on the imaging device 5 again is considered among light components causing the ghost, in Example 6, light reflected from the convex surface is incident on the imaging device 5 again. Therefore, the light is likely to be divergent light. As a result, it is possible to prevent the generation of the ghost.

Similar to the imaging lens according to Example 6, the imaging lenses according to Example 7, 8, and 10 to 12 are configured to prevent the generation of a ghost, and the sixth lens L6 is a meniscus lens having a convex surface facing the image side.

Table 13 shows values corresponding to Conditional expressions 1 to 13 in the imaging lenses according to Examples 1 to 12. In Examples 1 to 12, the d-line is used as a reference wavelength, and Table 13 shows each value at the reference wavelength. In this case, the air space of the cemented lens is 0. As can be seen from Table 13, Examples 1 to 12 satisfy all of Conditional expressions 1 to 13.

TABLE 13

| | Conditional expression | | | | | |
|---|---|---|---|---|---|---|
| Example | (1) $\|R3r/R4f\|$ | (2) $f_{3456}/f$ | (3) $f_5/f$ | (4) $f_6/f$ | (5) $f_3/f$ | (6) $R9/f$ |
| 1 | 0.73 | 1.63 | 0.98 | −0.90 | −0.95 | −0.69 |
| 2 | 0.10 | 1.09 | 1.12 | −1.71 | −1.22 | −1.04 |
| 3 | 0.73 | 1.28 | 1.12 | −0.95 | −0.90 | −0.77 |
| 4 | 0.54 | 1.37 | 0.83 | −0.86 | −1.01 | −0.72 |
| 5 | 0.65 | 1.52 | 0.88 | −1.20 | −0.73 | −0.70 |
| 6 | 0.39 | 1.36 | 1.05 | −1.24 | −0.76 | −0.92 |
| 7 | 0.00 | 1.18 | 1.08 | −1.47 | −1.02 | −0.89 |
| 8 | 0.00 | 1.13 | 1.13 | −1.48 | −1.24 | −0.94 |
| 9 | 0.40 | 1.67 | 0.96 | −0.86 | −0.89 | −0.71 |
| 10 | 0.39 | 1.36 | 1.05 | −1.24 | −0.76 | −0.92 |
| 11 | 0.00 | 1.18 | 1.08 | −1.47 | −1.02 | −0.89 |
| 12 | 0.00 | 1.13 | 1.13 | −1.48 | −1.24 | −0.94 |

| | Conditional expression | | | | | | |
|---|---|---|---|---|---|---|---|
| Example | (7) $f_4/f_5$ | (8) $L/f$ | (9) $Bf/f$ | (10) $f_{56}/f$ | (11) $\|f_{34}/f\|$ | (12) $R1/f$ | (13) $D11/f$ |
| 1 | 0.99 | 2.40 | 0.46 | 5.55 | 3.36 | 1.43 | 0.04 |
| 2 | 1.07 | 3.80 | 1.01 | 2.33 | 3.18 | 1.75 | 0.03 |
| 3 | 0.67 | 2.68 | 0.53 | 19.65 | 1.72 | 1.67 | 0.05 |
| 4 | 1.28 | 2.48 | 0.53 | 3.14 | 3.90 | 1.66 | 0.00 |
| 5 | 1.24 | 2.48 | 0.58 | 2.05 | 24.98 | 1.53 | 0.00 |
| 6 | 0.94 | 3.24 | 0.52 | 2.56 | 6.56 | 1.31 | 0.17 |
| 7 | 1.10 | 3.94 | 0.66 | 2.22 | 5.17 | 1.39 | 0.17 |
| 8 | 1.11 | 3.56 | 0.76 | 2.34 | 3.71 | 1.42 | 0.18 |
| 9 | 0.97 | 2.41 | 0.46 | 5.89 | 3.36 | 1.43 | 0.04 |
| 10 | 0.94 | 3.24 | 0.52 | 2.56 | 6.56 | 1.31 | 0.17 |
| 11 | 1.10 | 3.94 | 0.66 | 2.22 | 5.17 | 1.39 | 0.17 |
| 12 | 1.11 | 3.56 | 0.76 | 2.34 | 3.71 | 1.42 | 0.18 |

Figure 15:
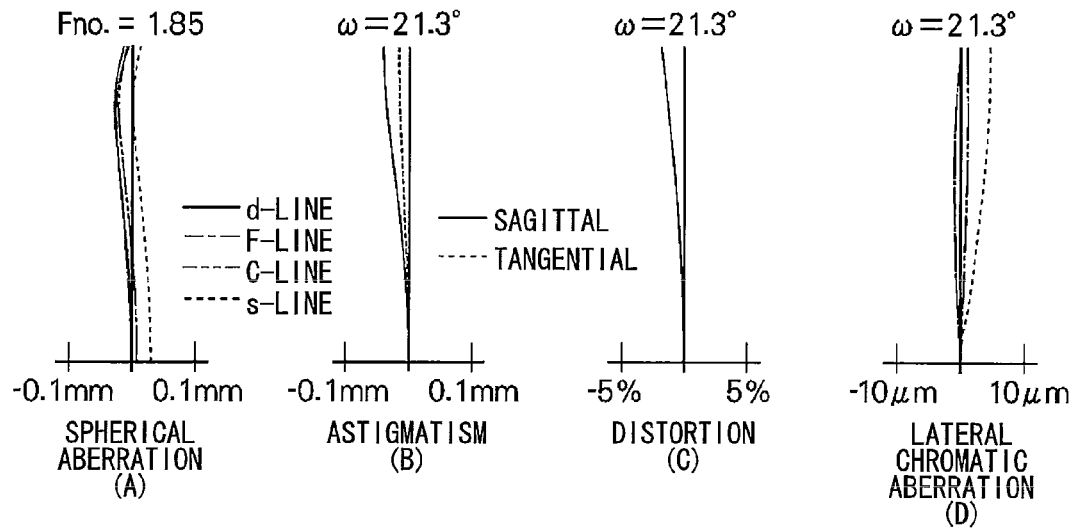
FIG. 15 is a diagram illustrating the aberrations of the imaging lens according to Example 1, in which (A) shows spherical aberration, (B) shows astigmatism, (C) shows distortion, and (D) shows lateral chromatic aberration.

FIG. 15 is a diagram illustrating the aberrations of the imaging lens according to Example 1, in which (A) shows spherical aberration, (B) shows astigmatism, (C) shows distortion, and (D) shows lateral chromatic aberration. Each of the aberration diagrams shows aberration when the d-line is used as the reference wavelength. The spherical aberration diagram and the lateral chromatic aberration diagram also show aberrations with respect to the F-line (wavelength: 486.1 nm), the C-line (wavelength: 656.3 nm), and the s-line (wavelength: 852.1 nm). In the spherical aberration diagram, Fno. indicates the F number. In the other aberration diagrams, ω indicates a half angle of view. The distortion diagram shows the amount of deviation from an ideal image height f×tan φ when the focal length of the entire lens system is f and an angle of view is φ (a variable, $0 \leq \phi \leq \omega$).

Figure 16:
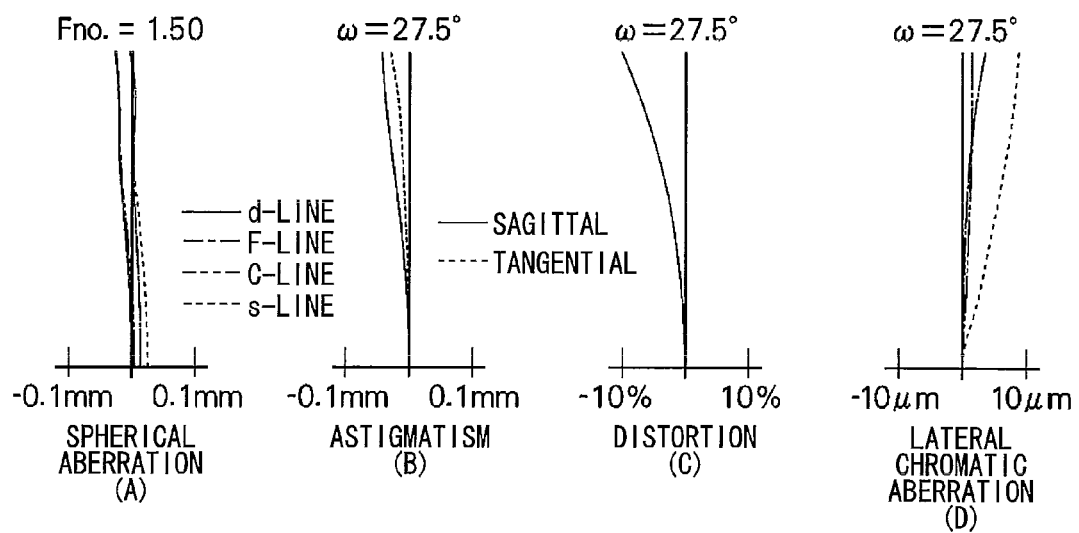
FIG. 16 is a diagram illustrating the aberrations of the imaging lens according to Example 2, in which (A) shows spherical aberration, (B) shows astigmatism, (C) shows distortion, and (D) shows lateral chromatic aberration.
Figure 17:
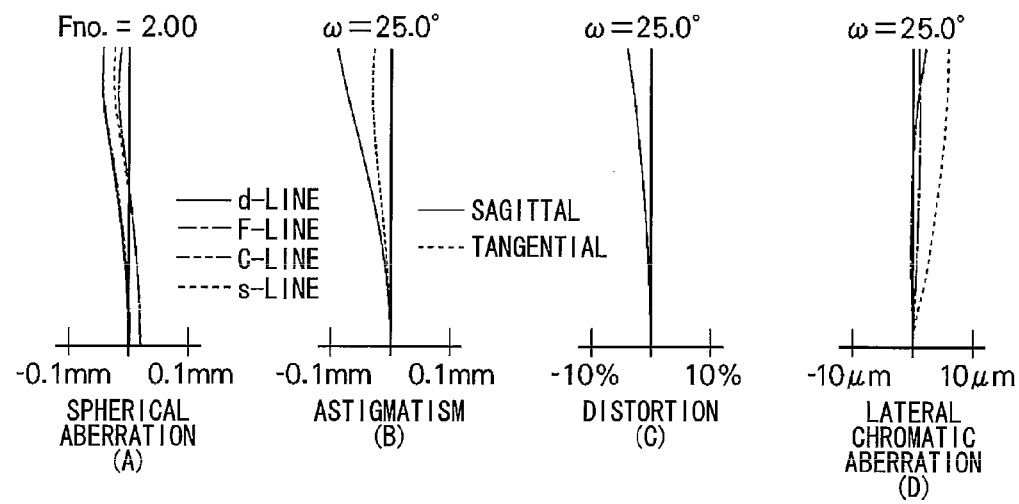
FIG. 17 is a diagram illustrating the aberrations of the imaging lens according to Example 3, in which (A) shows spherical aberration, (B) shows astigmatism, (C) shows distortion, and (D) shows lateral chromatic aberration.
Figure 18:
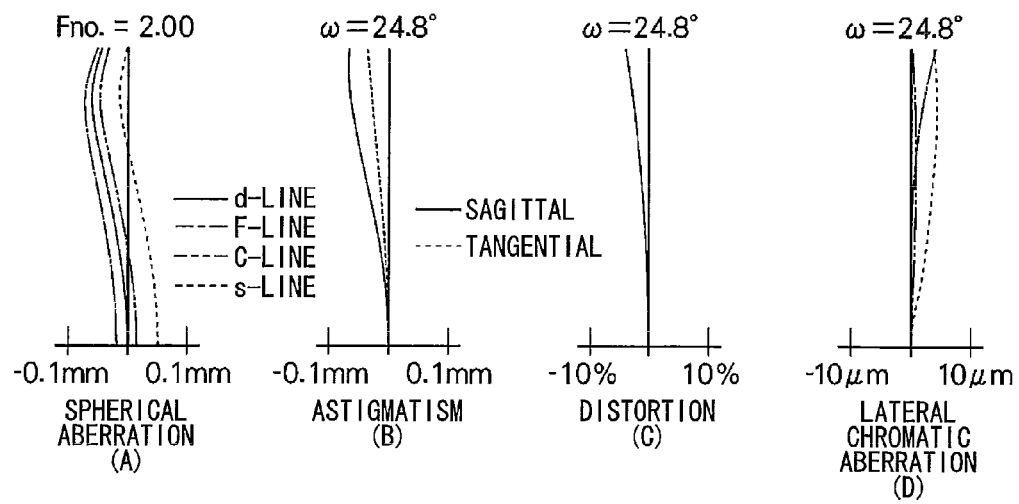
FIG. 18 is a diagram illustrating the aberrations of the imaging lens according to Example 4, in which (A) shows spherical aberration, (B) shows astigmatism, (C) shows distortion, and (D) shows lateral chromatic aberration.
Figure 19:
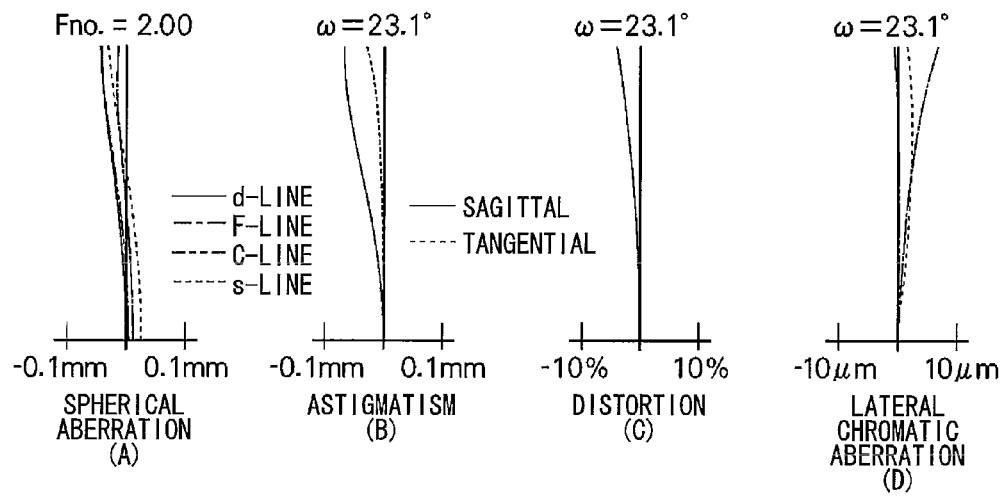
FIG. 19 is a diagram illustrating the aberrations of the imaging lens according to Example 5; in which (A) shows spherical aberration, (B) shows astigmatism, (C) shows distortion, and (D) shows lateral chromatic aberration.
Figure 20:
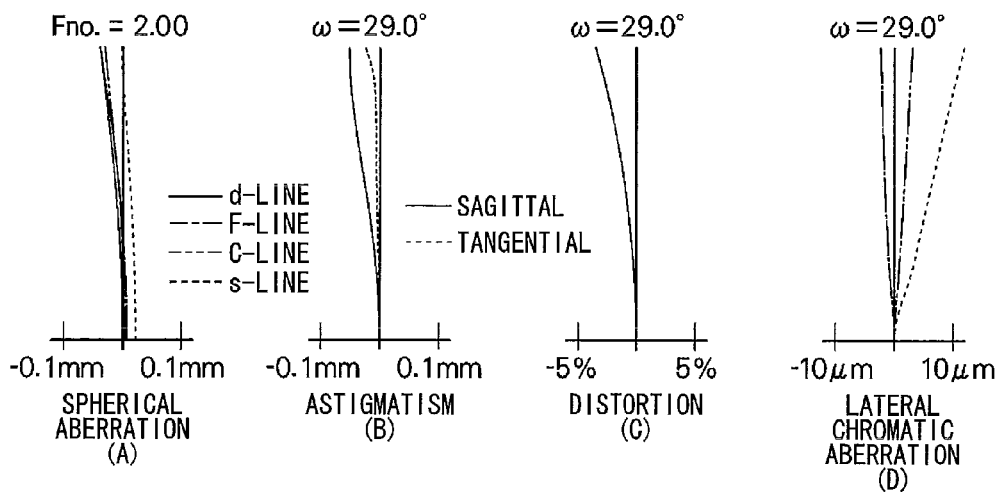
FIG. 20 is a diagram illustrating the aberrations of the imaging lens according to Example 6, in which (A) shows spherical aberration, (B) shows astigmatism, (C) shows distortion, and (D) shows lateral chromatic aberration.
Figure 21:
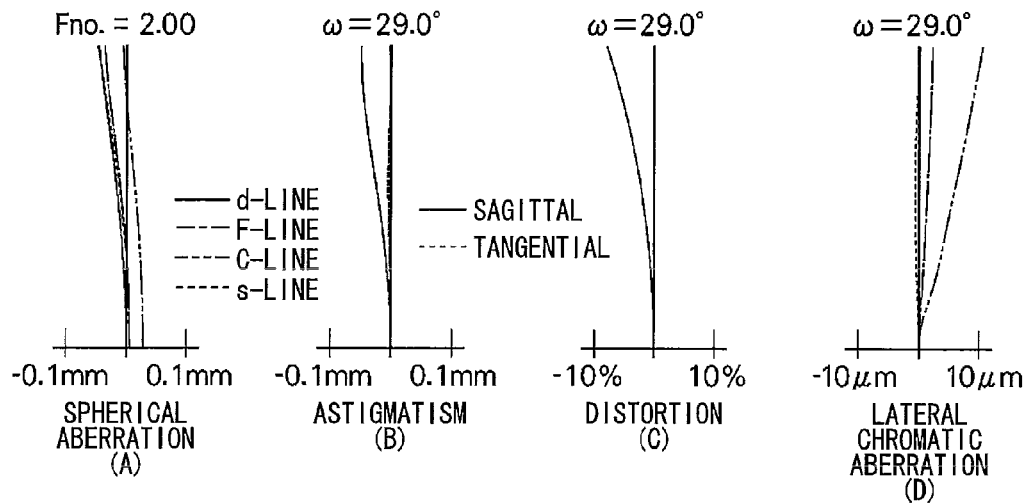
FIG. 21 is a diagram illustrating the aberrations of the imaging lens according to Example 7, in which (A) shows spherical aberration, (B) shows astigmatism, (C) shows distortion, and (D) shows lateral chromatic aberration.
Figure 22:
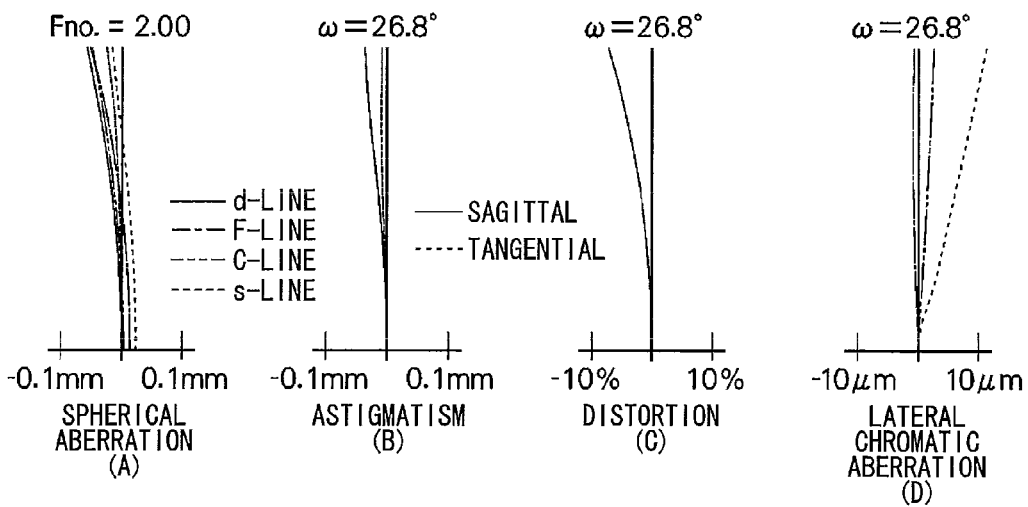
FIG. 22 is a diagram illustrating the aberrations of the imaging lens according to Example 8, in which (A) shows spherical aberration, (B) shows astigmatism, (C) shows distortion, and (D) shows lateral chromatic aberration.
Figure 25:
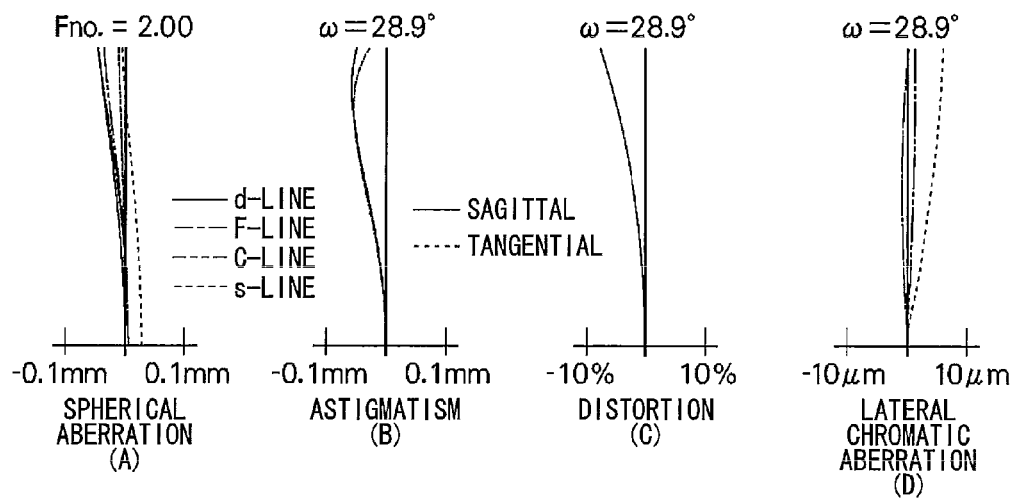
FIG. 25 is a diagram illustrating the aberrations of the imaging lens according to Example 11, in which (A) shows spherical aberration, (B) shows astigmatism, (C) shows distortion, and (D) shows lateral chromatic aberration.
Figure 26:
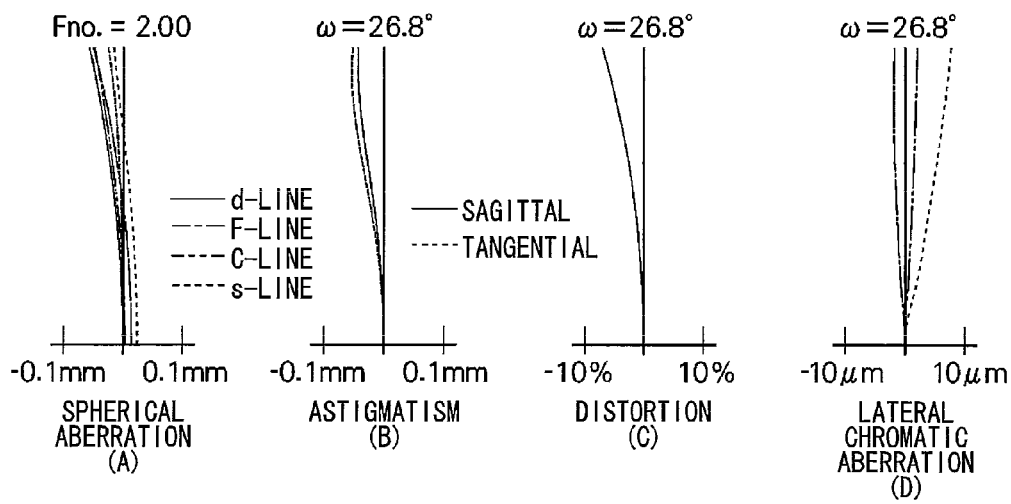
FIG. 26 is a diagram illustrating the aberrations of the imaging lens according to Example 12, in which (A) shows spherical aberration, (B) shows astigmatism, (C) shows distortion, and (D) shows lateral chromatic aberration.

Similarly, the spherical aberration, astigmatism, distortion, and lateral chromatic aberration of the imaging lenses according to Examples 2 to 12 are shown in (A) to (D) of FIG. 16, (A) to (D) of FIG. 17, (A) to (D) of FIG. 18, (A) to (D) of FIG. 19, (A) to (D) of FIG. 20, (A) to (D) of FIG. 21, (A) to (D) of FIG. 22, (A) to (D) of FIG. 23, (A) to (D) of FIG. 24, (A) to (D) of FIG. 25, and (A) to (D) of FIG. 26, respectively. As can be seen from the aberration diagrams, in Examples 1 to 12, aberration is effectively corrected from a visible range to a near-infrared range.

The imaging lenses according to Examples 1 to 12 each include six spherical lenses made of glass. Therefore, it is possible to manufacture an imaging lens that has little variation in performance due to a temperature variation and can be used in a wide temperature range with a low manufacturing cost. In addition, the imaging lenses according to Examples 1 to 3, 6, and 7 to 12 do not use a cemented lens. Therefore, it is possible to manufacture an imaging lens with a low manufacturing cost, as compared to a lens system using the cemented lens. Further, the imaging lenses according to Examples 1 to 12 have high optical performances, and in a fast optical system having an F number of 1.5 to 2.0, aberration is effectively corrected from a visible range to an infrared range. Therefore, the imaging lenses can be appropriately used for an in-vehicle camera or a monitoring camera for capturing, for example, the front, side, and rear images of a vehicle.

Figure 27:
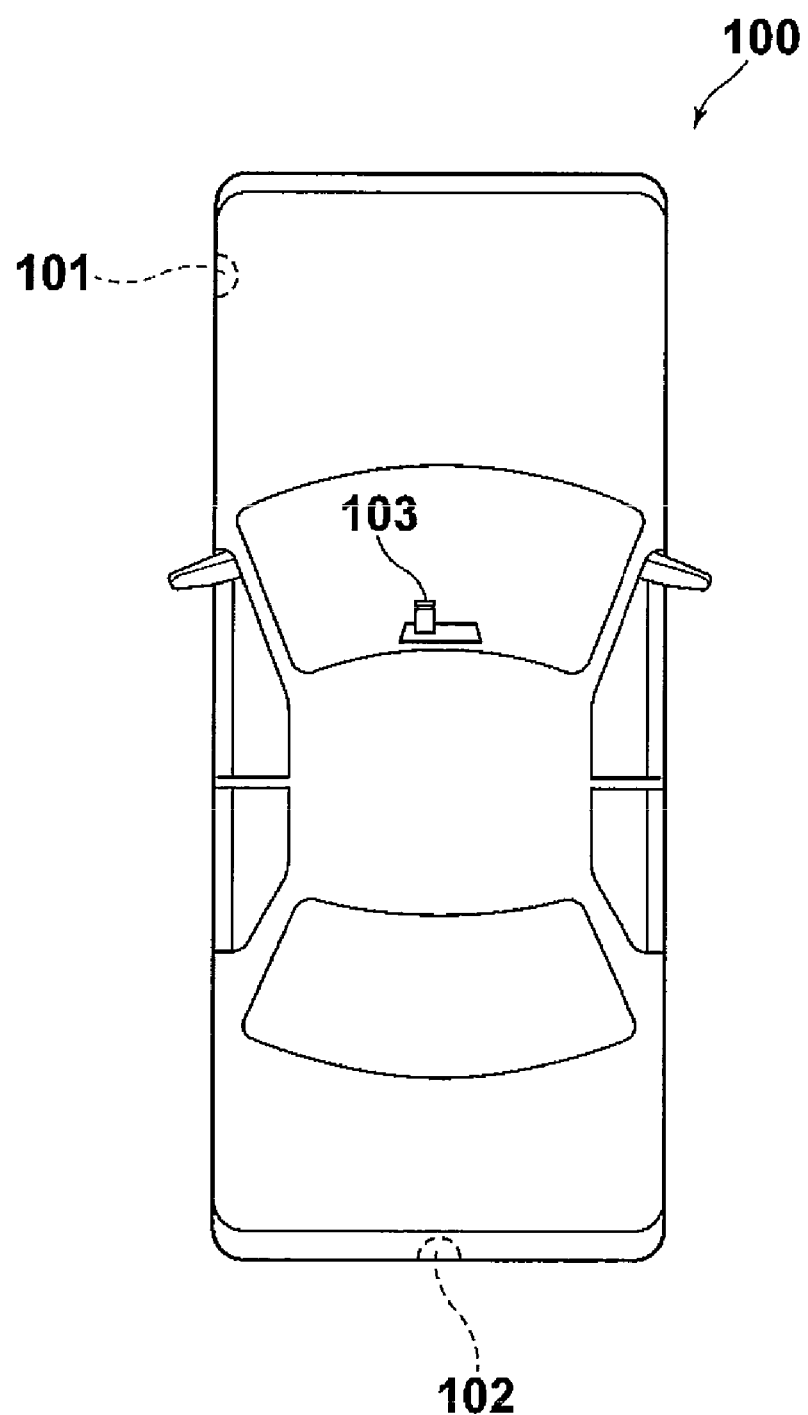
FIG. 27 is a diagram illustrating the arrangement of in-vehicle imaging apparatuses according to an embodiment of the invention.

FIG. 27 shows an example in which an imaging apparatus including the imaging lens according to this embodiment is provided in a vehicle 100. In FIG. 27, the vehicle 100 includes an outside camera 101 that captures the image of a passenger side blind spot, an outside camera 102 that captures the image of a blind spot on the rear side of the vehicle 100, and an inside camera 103 that is mounted to the rear surface of a room mirror and captures an image in the same visible range as that of a driver. Each of the outside camera 101, the outside camera 102, and the inside camera 103 is an imaging apparatus according to this embodiment of the invention, and includes the imaging lens according to each of the above-mentioned examples of the invention and an imaging device that converts an optical image formed by the imaging lens into electric signals.

Since each of the imaging lenses according to the above-mentioned examples of the invention has the above-mentioned advantages, each of the outside cameras 101 and 102 and the inside camera 103 can be manufactured with a low cost and a small size, and it is possible to form a high-quality image on the imaging surface of the imaging device of the camera.

Although the embodiment and the examples of the invention have been described above, the invention is not limited to the embodiment and the examples, but various modifications and changes of the invention can be made. For example, the curvature radius, surface spacing, refractive index, and Abbe number of each lens component are not limited to the values of the above-described numerical examples, but each lens component may have other values.

Further, in the above-described embodiment of the invention, the imaging apparatus is applied to an in-vehicle camera, but the invention is not limited thereto. For example, the invention may be applied to a mobile terminal camera or a monitoring camera.

What is claimed is:

1. An imaging lens comprising:
   a first lens that is made of glass, has a negative power and includes a concave surface facing an image side;
   a second lens having a positive power;
   a third lens having a negative power;
   a fourth lens having a positive power;
   a fifth lens that has a positive power and includes a convex surface facing the image side;
   a sixth lens having a negative power; and
   a stop positioned in rear of the second lens or the third lens,
   wherein the first to sixth lenses are arranged in this order from an object side, and
   when the curvature radius of an image-side surface of the third lens is R3$r$ and the curvature radius of an object-side surface of the fourth lens is R4$f$, the imaging lens satisfies the following conditional expression:

$|R3r/R4f|<1.0;$ wherein the Abbe number of the fourth lens with respect to the d-line is equal to or greater than 35,
   the Abbe number of the fifth lens with respect to the d-line is equal to or greater than 35, and
   the Abbe number of the sixth lens with respect to the d-line is equal to or less than 30.

2. The imaging lens according to claim 1, wherein the third lens is a biconcave lens.

3. The imaging lens according to claim 1, wherein, when the focal length of the entire lens system is f and a composite focal length from the third lens to the sixth lens is f3456, the imaging lens satisfies the following conditional expression:

$f3456/f>0.8.$

4. The imaging lens according to claim 1, wherein, when the focal length of the entire lens system is f and the focal length of the fifth lens is f5, the imaging lens satisfies the following conditional expression:

$0.6<f5/f<1.2.$

5. The imaging lens according to claim 1, wherein, when the focal length of the entire lens system is f and the focal length of the sixth lens is f6, the imaging lens satisfies the following conditional expression:

$-2.0<f6/f<-0.6.$

6. The imaging lens according to claim 1, wherein, when the focal length of the entire lens system is f and the focal length of the third lens is f3, the imaging lens satisfies the following conditional expression:

$-1.5<f3/f<-0.5.$

7. The imaging lens according to claim 1, wherein, when the focal length of the entire lens system is f and the curvature radius of an image-side surface of the fourth lens is R9, the imaging lens satisfies the following conditional expression:

$-1.2<R9/f<-0.5.$

8. The imaging lens according to claim 1, wherein, when the focal length of the fourth lens is f4 and the focal length of the fifth lens is f5, the imaging lens satisfies the following conditional expression:

$0.5<f4/f5<1.5.$

9. The imaging lens according to claim 1, wherein the Abbe number of the second lens with respect to the d-line is greater than 32.

10. The imaging lens according to claim 1, wherein the Abbe number of the first lens with respect to the d-line is equal to or greater than 40.

11. An imaging apparatus comprising the imaging lens according to claim 1.

12. The imaging lens according to claim 1, wherein $|R3r/R4f1<0.9.$

13. The imaging lens according to claim 1, wherein the first lens has a meniscus shape in which a concave surface faces the image side.

14. An imaging lens comprising:
    a first lens that has a negative power and includes a concave surface facing an image side;
    a second lens having a positive power;
    a third lens having a negative power;
    a fourth lens having a positive power;
    a fifth lens that has a positive power and includes a convex surface facing the image side;
    a sixth lens having a negative power; and
    a stop positioned in rear of the second lens or the third lens,
    wherein the first to sixth lenses are arranged in this order from an object side, and
    each of the lenses is a single lens;
    wherein the Abbe number of the fourth lens with respect to the d-line is equal to or greater than 35,
    the Abbe number of the fifth lens with respect to the d-line is equal to or greater than 35, and
    the Abbe number of the sixth lens with respect to the d-line is equal to or less than 30.

15. An imaging lens consisting of:
    a first lens that is made of glass, has a negative power and includes a concave surface facing an image side;
    a second lens having a positive power;
    a third lens having a negative power;
    a fourth lens having a positive power;
    a fifth lens that has a positive power and includes a convex surface facing the image side;
    a sixth lens having a negative power and including a concave surface facing the object side; and
    a stop positioned in rear of the second lens or the third lens,
    wherein the first to sixth lenses are arranged in this order from an object side, and when the curvature radius of an image-side surface of the third lens is R3r and the curvature radius of an object-side surface of the fourth lens is R4f, the imaging lens satisfies the following conditional expression:

$|R3r/R4f| < 1.0.$

16. An imaging lens consisting of:
a first lens that has a negative power and includes a concave surface facing an image side;
a second lens having a positive power;
a third lens having a negative power;
a fourth lens having a positive power;
a fifth lens that has a positive power and includes a convex surface facing the image side;
a sixth lens having a negative power and including a concave surface facing the object side; and
a stop positioned in rear of the second lens or the third lens,
wherein the first to sixth lenses are arranged in this order from an object side, and
each of the lenses is a single lens.

* * * * *